(12) United States Patent
Bunn et al.

(10) Patent No.: US 8,485,741 B1
(45) Date of Patent: Jul. 16, 2013

(54) INTENSIFIED PINHOLE CAMERA SYSTEM

(75) Inventors: Thomas L. Bunn, Simi Valley, CA (US); Lynne C. Eigler, Simi Valley, CA (US)

(73) Assignee: The Boeing Company, Chicago, IL (US)

( * ) Notice: Subject to any disclaimer, the term of this patent is extended or adjusted under 35 U.S.C. 154(b) by 51 days.

(21) Appl. No.: 12/817,608

(22) Filed: Jun. 17, 2010

(51) Int. Cl.
*G03B 17/00* (2006.01)

(52) U.S. Cl.
USPC .................. 396/439; 348/217.1; 348/777

(58) Field of Classification Search
USPC ................. 396/439; 348/217.1, 777
See application file for complete search history.

(56) References Cited

U.S. PATENT DOCUMENTS

| | | | |
|---|---|---|---|
| 4,186,302 A | | 1/1980 | Wang |
| 4,521,688 A | * | 6/1985 | Yin .......................... 250/363.04 |
| 5,214,503 A | * | 5/1993 | Chiu et al. .................. 348/217.1 |
| 7,129,464 B2 | | 10/2006 | Buchin |
| 7,154,658 B2 | | 12/2006 | Maram et al. |
| 7,251,068 B2 | | 7/2007 | Maram et al. |
| 7,283,291 B2 | | 10/2007 | Maram et al. |
| 7,443,593 B2 | | 10/2008 | Maram et al. |
| 7,502,154 B2 | | 3/2009 | Maram et al. |
| 7,633,671 B2 | | 12/2009 | Maram et al. |
| 7,672,056 B2 | | 3/2010 | Maram et al. |
| 7,907,331 B2 | | 3/2011 | Maram et al. |
| 2005/0162526 A1 | * | 7/2005 | Dennis et al. .............. 348/217.1 |
| 2006/0081770 A1 | * | 4/2006 | Buchin .................. 250/214 VT |

FOREIGN PATENT DOCUMENTS

JP 58214129 A * 12/1983

OTHER PUBLICATIONS

Translation of the Abstract of the JP Publication No. 58-214129; Title: Spectral Imaging Device Acoustooptic Filter; Inventor: Hirano et al.; Publication Date: Dec. 13, 1983.*
U.S. Appl. No. 12/817,581, filed Jun. 17, 2010, Bunn.
U.S. Appl. No. 12/615,054, filed Nov. 9, 2009, Hunt et al.
Notice of Allowance, dated Jul. 20, 2012, regarding USPTO U.S. Appl. No. 12/817,581, 13 pages.

* cited by examiner

*Primary Examiner* — W B Perkey
*Assistant Examiner* — Fang-Chi Chang
(74) *Attorney, Agent, or Firm* — Yee & Associates, P.C.

(57) ABSTRACT

A method and apparatus for generating an image. Light is passed though an opening of a housing. The light has an intensity. At least a portion of the light received through the opening is increased using an intensifier unit to form intensified light. The intensified light is converted into a number of signals for the image using an image detection system located inside of the housing.

23 Claims, 14 Drawing Sheets

INTENSIFIED PINHOLE CAMERA SYSTEM

CROSS-REFERENCE TO RELATED APPLICATION

This application is related to the following patent application entitled: "Image Intensifier Tube with Zoom and Pan Capabilities", Ser. No. 12/817,581, filed even date hereof, assigned to the same assignee, and incorporated herein by reference.

BACKGROUND INFORMATION

1. Field

The present disclosure relates generally to camera systems and, in particular, to pinhole camera systems. Further, the present disclosure also relates to intensifier units for camera systems.

2. Background

Camera systems are used with a number of different types of platforms. These different types of platforms include, for example, without limitation, mobile platforms and stationary platforms. Mobile platforms may include fixed-wing aircraft, rotor-wing aircraft, helicopters, missiles, spacecraft, ships, submarines, ground vehicles, tanks, and other suitable types of mobile platforms. Stationary platforms may include buildings, walls, ceilings, poles, and other suitable types of stationary platforms. Camera systems may be used with these different types of platforms to perform a number of different operations. These operations include, for example, without limitation, surveillance, reconnaissance, and other types of operations.

Currently available camera systems often have housings that may be attached to a platform. For example, a camera system may have a housing attached to the underside of an aircraft or unmanned aerial vehicle or a housing that protrudes through the fuselage of an aircraft. These types of housings may have undesired effects on the flight dynamics of the aircraft and unmanned aerial vehicles.

In some examples, the camera system may be mounted on a platform or turret that can move. For example, the camera housing may move using gimbals. A gimbal is a pivoted support structure that can rotate about an axis. Two gimbals may be used to enable rotation in two axes providing a larger field of regard for the camera system.

Camera systems are used to create images of objects. These objects may be, for example, terrain, buildings, people, vehicles, and other structures or locations. If the camera system has a visible gimbal or housing, or a signature shape, then it may be possible for those being observed to become aware of the camera systems observing them. For example, those being observed may be able to see a camera system attached to the exterior of an aircraft or a camera system protruding through the surface of an aircraft. Further, if such camera systems are detected, then countermeasures may be employed to make these camera systems inoperable. These countermeasures may include, for example, laser beams directed at camera systems.

Currently, most of the available camera systems use optical lenses to provide focus and zoom capabilities. These types of camera systems may require manual and/or automatic adjustments to change the focus or to zoom the lens. Further, currently available camera systems may handle only a limited range of lighting conditions and may be designed for a limited range of wavelengths. For example, one camera system is used for daylight surveillance, and another camera system is used for twilight surveillance and nighttime surveillance. Thermal imaging camera systems may be needed for nighttime surveillance.

Therefore, it would be advantageous to have a method and apparatus which takes into account one or more of the issues discussed above, as well as possibly other issues.

SUMMARY

In one advantageous embodiment, an apparatus comprises a housing and an intensifier unit located inside of the housing. The housing has an opening configured to pass light into the housing. The light has an intensity. The intensifier unit is configured to receive at least a portion of the light passing through the opening and increase the intensity of the light to form intensified light.

In another advantageous embodiment, a method is present for generating an image. Light passes through an opening of a housing. The light has an intensity. At least a portion of the light received through the opening is increased using an intensifier unit to form intensified light. The intensified light is converted into a number of signals for the image using an image detection system located inside of the housing.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
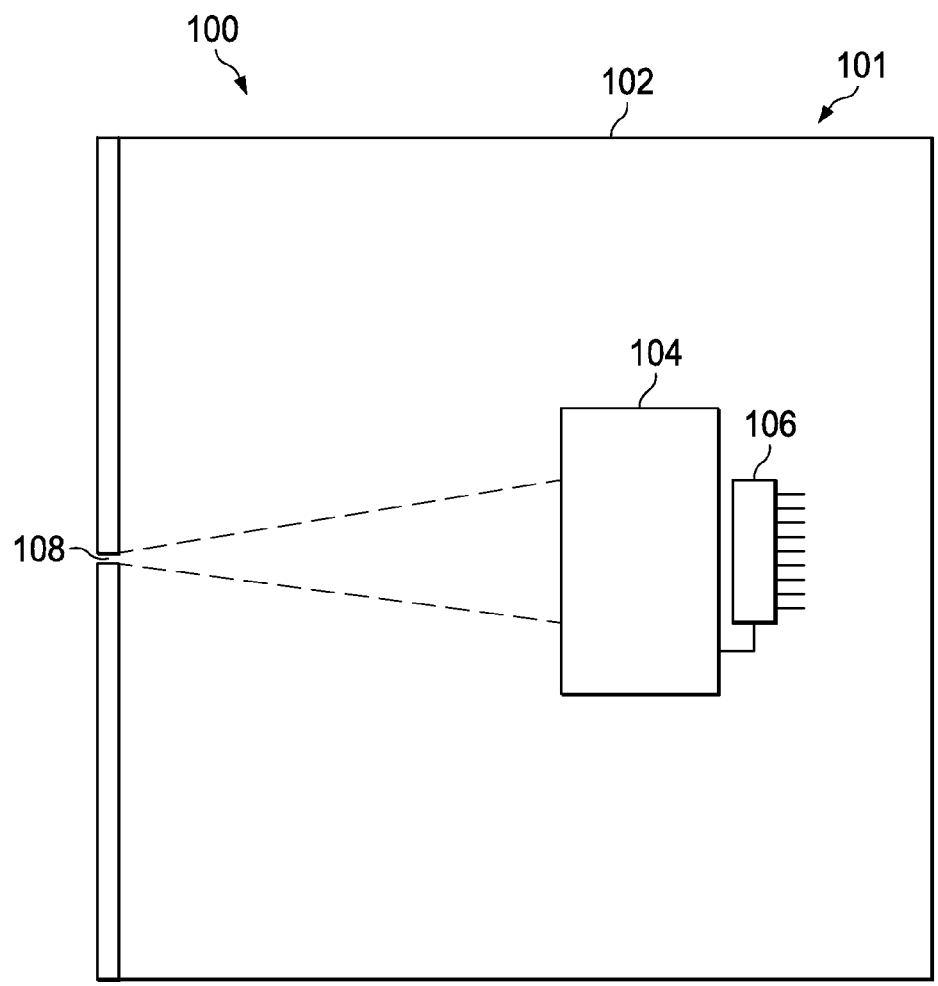
FIG. 1 is an illustration of a camera system in accordance with an advantageous embodiment.

The different advantageous embodiments recognize and take into account a number of different considerations. For example, the different advantageous embodiments recognize and take into account that with currently available camera systems, objects near to and far from these camera systems may not be in focus at the same time when generating an image. Further, with currently available camera systems, focusing may require manual and/or automatic adjustments.

The different advantageous embodiments recognize and take into account that different lighting conditions may require the use of different types of camera systems. For example, different camera systems may be needed for imaging in daylight, twilight, and nighttime conditions.

The different advantageous embodiments also recognize and take into account that with currently available camera systems, gimbals are used to provide movement for the camera systems. These gimbals have moving parts that may be subject to wear and tear over time. Further, over time, these gimbals may not operate as desired to provide desired movement for the camera systems.

The different advantageous embodiments also recognize and take into account that it may be desirable to have a camera system that has zoom and pan capabilities that maintain a desired image resolution. With currently available camera systems, a mechanical movement of a lens system may be needed to zoom, and a gimbal system may be needed to pan while maintaining focus.

The different advantageous embodiments recognize and take into account that pinhole camera systems allow images to be generated with substantially no distortion, even with a wide field of view. Further, the depth of field for a pinhole camera system approaches substantially infinity. In other words, pinhole camera systems do not need to be adjusted to be in focus because the depth of field approaches substantially infinity.

However, the different advantageous embodiments recognize and take into account that with a pinhole camera system, different wavelengths of light may not focus at the same locations relative to the optimum image plane for the pinhole camera system. In other words, different colors of light may not focus at the same locations relative to the optimum image plane. The optimum image plane is the plane at which the image formed by the light passing through the opening of a pinhole camera system has a substantially infinite depth of focus.

Thus, the different advantageous embodiments provide an apparatus for generating images. This apparatus may be referred to as a pinhole camera system. In one advantageous embodiment, the apparatus comprises a housing and an intensifier unit located inside of the housing. The housing has an opening configured to pass light into the housing. Light may not be allowed to enter the housing other than through the opening. The light has an intensity. The intensity is dependent upon the amount of light reflected from each of the objects being imaged.

The intensifier unit is configured to receive at least a portion of the light passing through the hole and increase the intensity of the light to form intensified light.

In another advantageous embodiment, an apparatus comprises a housing, an input unit, a number of electrostatic lenses, a number of electrostatic deflectors, an electron multiplier, and an output unit inside the housing. The housing has an input and an output. The housing is configured to substantially provide a vacuum inside the housing. The input unit is configured to convert input light received at the input of the housing into initial electrons.

The number of electrostatic lenses is configured to cause movement of the initial electrons to diverge from an axis through the number of electrostatic lenses to form diverged electrons. The electron multiplier is configured to receive at least a portion of the diverged electrons and cause the emission of additional electrons to generate an increased number of electrons. The output unit is configured to convert the increased number of electrons as output light that exits the output of the housing.

With reference now to FIG. 1, an illustration of a camera system is depicted in accordance with an advantageous embodiment. In this illustrative example, camera system 100 may be used to generate images. Camera system 100 takes the form of pinhole camera system 101 in this example.

As depicted, camera system 100 may comprise housing 102, intensifier unit 104, and image detection system 106. Intensifier unit 104 and image detection system 106 may be located in housing 102.

Housing 102 may be associated with a number of different types of platforms. For example, without limitation, housing 102 may be associated with a platform selected from one of an aircraft, a helicopter, an unmanned aerial vehicle, a submarine, a spacecraft, a missile, a launch vehicle, a ground vehicle, or some other suitable type of platform.

A first component may be considered to be associated with a second component by being secured, attached, bonded, fastened, and/or mounted to the second component. Further, the first component may be associated with the second component by being connected to the second component in some other suitable manner. For example, housing 102 may be mounted to the bottom side of an unmanned aerial vehicle.

Further, the first component also may be connected to the second component by using a third component. The first component may also be considered to be associated with the second component by being formed as part of and/or an extension of the second component. As depicted, housing 102 has opening 108 to allow light to pass inside housing 102. Opening 108 has a diameter given by the equation:

$$d = \sqrt{fk\lambda} \qquad (1)$$

where d is the diameter of opening 108, f is the distance from opening 108 to the optimal image plane, $\lambda$ is the wavelength of the light, and k is a constant. In some cases, f may also be referred to as the focal length.

Intensifier unit 104 may be configured to receive at least a portion of the light passing through opening 108. The light received at intensifier unit 104 may be in the form of an image.

Intensifier unit 104 may be configured to convert the light received at intensifier unit 104 into intensified light. In this manner, the image formed by the light may be converted to an intensified image.

Image detection system 106 may be configured to detect the intensified light in the form of the intensified image. Additionally, in this illustrative example, image detection system 106 may be configured to convert the intensified light into a signal for a digital image in response to detecting the intensified light.

Figure 2:
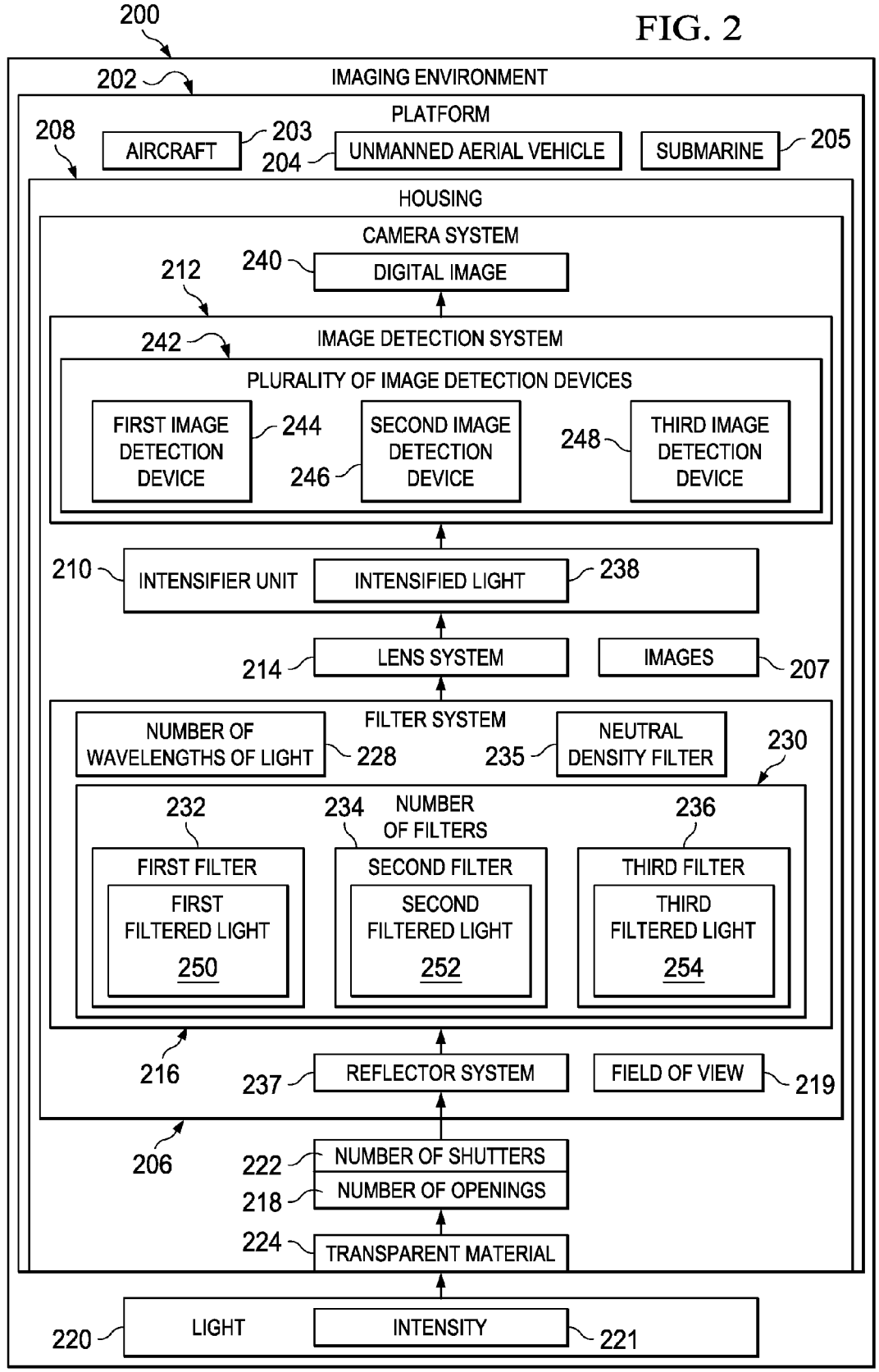
FIG. 2 is an illustration of an imaging environment in accordance with an advantageous embodiment.

With reference now to FIG. 2, an illustration of an imaging environment is depicted in accordance with an advantageous embodiment. In this illustrative example, imaging environment 200 includes platform 202. In this illustrative example, platform 202 takes the form of aircraft 203. In other illustrative examples, platform 202 may take the form of unmanned aerial vehicle 204, submarine 205, or some other suitable type of platform.

As depicted, camera system 206 is associated with platform 202. Camera system 100 in FIG. 1 may be implemented using camera system 206. More specifically, pinhole camera system 101 in FIG. 1 may be implemented using camera system 206.

In this illustrative example, camera system 206 is located in platform 202. Camera system 206 may be used for operations, such as, for example, without limitation, surveillance, reconnaissance, and/or other types of operations. Camera system 206 is used to generate images 207. Images 207 may be still images or moving images. As one illustrative example, when platform 202 takes the form of aircraft 203, camera system 206 may be a video camera system used to take video streams of images of an area over which aircraft 203 is flying.

As depicted, camera system 206 comprises housing 208, intensifier unit 210, and image detection system 212. Camera system 206 is contained within housing 208. Further, intensifier unit 210 and image detection system 212 are located in housing 208 of camera system 206.

In this illustrative example, housing 208 has number of openings 218. A "number of", when referring to items, may be one or more items. For example, number of openings 218 may be one or more openings. Each of number of openings 218 may be referred to as a pinhole. Each of number of openings 218 allows light 220 to pass into housing 208. Further, each of number of openings 218 may be substantially the same size in these examples.

In these illustrative examples, housing 208 may be configured such that light is not allowed to pass into housing 208 other than through number of openings 218. In other words, housing 208 provides darkness for camera system 206 except for light 220 passing through number of openings 218.

Light 220 may be selectively allowed to pass through number of openings 218 using number of shutters 222. For example, number of shutters 222 may open to allow light 220 to pass into housing 208 or close to prevent light 220 from passing into housing 208. In this illustrative example, number of shutters 222 may open one at a time.

In this illustrative example, each of number of shutters 222 may correspond to an opening in number of openings 218. In other illustrative examples, number of shutters 222 may be one shutter for multiple openings in number of openings 218.

When number of shutters 222 is closed, number of shutters 222 protects camera system 206 from undesired sources of light. These undesired sources of light may include, for example, without limitation, light 220 having intensity 221 greater than a selected level, laser beams, and/or other undesired sources of light.

When number of shutters 222 is open, light 220 passes through transparent material 224 associated with number of openings 218 in this illustrative example. Transparent material 224 may be, for example, air, a transparent film, a piece of glass, a piece of plastic, or some other suitable transparent material. Transparent material 224 may be placed over number of openings 218 or in number of openings 218.

In some cases, transparent material 224 may be selected to protect the components within housing 208 from elements in the environment outside housing 208. For example, without limitation, transparent material 224 may be a piece of glass that prevents dust, air particles, and/or other elements from entering number of openings 218. Further, transparent material 224 may be selected to prevent elements from entering and/or obstructing number of openings 218.

Number of openings 218 and transparent material 224 provide field of view 219 for camera system 206. Field of view 219 is the area that is visible to camera system 206 at a particular position and orientation in space. In other words, objects outside of field of view 219 or past field of view 219 may not be captured in the images generated by camera system 206.

Field of view 219 may be determined by the smaller of two ratios. The first ratio is the diameter of each of number of openings 218 relative to the thickness of transparent material 224. The second ratio is the diameter of the input area of intensifier unit 210 relative to the distance from number of openings 218 to this input area. The input area of intensifier unit 210 is the area that receives at least a portion of light 220.

Light 220 passes through number of openings 218 and transparent material 224 and forms an optical image on intensifier unit 210. When number of openings 218 includes more than one opening, each of the openings may be located in housing 208 such that a distance between an opening and intensifier unit 210 is substantially the same for each of number of openings 218. In this manner, the optical image formed at intensifier unit 210 may be in focus.

Intensifier unit 210 is configured to receive at least a portion of light 220. At least a portion of light 220 may be some or all of light 220. Further, intensifier unit 210 is configured to increase intensity 221 of light 220 to form intensified light 238. Intensified light 238 may pass from intensifier unit 210 to image detection system 212 in housing 208.

In this illustrative example, image detection system 212 takes the form of a charge coupled device system. Further, image detection system 212 takes the form of a digital image generation system in this illustrative example. In other illustrative examples, image detection system 212 may take the form of any system configured to detect an image. For example, without limitation, image detection system 212 may take the form of a video recording system, an image recording system, human eyes, a piece of film, or some other suitable type of image detection system.

Image detection system 212 is comprised of an array of photodetectors in a plurality of sections on a surface of image detection system 212. In some illustrative examples, intensifier unit 210 and image detection system 212 may be referred together as an intensified camera.

Different types of intensified cameras may be used with camera system 206. In particular, intensifier unit 210 may be used with a number of different types of image detection systems 212 to form an intensified camera. For example, image detection system 212 may comprise a charge coupled device (CC), an electron beam charge coupled device (EB-CCD), or an electron multiplying charge coupled device (EB-CCD).

In response to detecting intensified light 238 when intensified light 238 is received at image detection system 212, the array of photodetectors generates electrical signals to form digital image 240. The electrical signals that form digital image 240 may be in the form of current or voltage. In this depicted example, each section in the plurality of sections on the surface of image detection system 212 corresponds to a pixel in digital image 240.

In some illustrative examples, housing 208 may also contain filter system 216, lens system 214, and/or reflector system 237. When light 220 passes through number of openings 218 into housing 208, light 220 may be received by intensifier unit 210. The image formed by intensifier unit 210 in response to receiving light 220 may be a monochromatic image. In these illustrative examples, filter system 216 may be used to filter for different wavelengths or colors of light 220 before light 220 reaches intensifier unit 210. In this manner, information for a particular color of light or range of wavelengths of light may be obtained using filter system 216.

Filter system 216 is used in camera system 206 to filter number of wavelengths of light 228. Filter system 216 comprises number of filters 230. Number of filters 230 may include any type of filter capable of filtering light 220 having a wavelength within some range of wavelengths.

As one illustrative example, number of filters 230 may include first filter 232, second filter 234, and third filter 236. First filter 232 may be configured to filter for blue light. Second filter 234 may be configured to filter for red light. Third filter 236 may be configured to filter for green light. In some examples, number of filters 230 may also include neutral density filter 235.

Camera system 206 may also include reflector system 237 in some illustrative examples. Reflector system 237 may be comprised of a number of reflectors, such as, for example, a number of mirrors. The number of mirrors may be positioned to direct light 220 passing through number of openings 218 to each of number of filters 230.

In still other illustrative example, camera system 206 may also include lens system 214. Light 220 passing through number of openings 218 and through filter system 216 may pass through lens system 214 before reaching intensifier unit 210. Lens system 214 is comprised of a number of lenses. Lens system 214 may be configured to focus light 220 to form an optical image at intensifier unit 210. Lens system 214 is configured to change field of view 219 for camera system 206.

In this illustrative example, image detection system 212 may be comprised of plurality of image detection devices 242. Plurality of image detection devices 242 may include, for example, first image detection device 244, second image detection device 246, and third image detection device 248. First image detection device 244 is configured to receive first filtered light 250 from first filter 232. Second image detection device 246 is configured to receive second filtered light 252 from second filter 234. Third image detection device 248 is configured to receive third filtered light 254 from third filter 236.

First filtered light 250, second filtered light 252, and third filtered light 254 are received at plurality of image detection devices 242 and may be combined into a signal for digital image 240 in color.

The illustration of imaging environment 200 in FIG. 2 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, camera system 206 may include additional intensifier units and/or image detection devices in addition to the ones described above. When more than one intensifier unit is present in camera system 206, more than one shutter may be open at one time. In other advantageous embodiments, intensifier unit 210 and image detection system 212 may be part of the same unit or system.

In yet other advantageous embodiments, housing 208 may contain additional camera systems in addition to camera system 206. In some advantageous embodiments, image detection system 212 may be replaced by some other suitable type of data recording device for converting light into an image for viewing.

In some advantageous embodiments, platform 202 may be some other suitable type of platform other than aircraft 203, unmanned aerial vehicle 204, or submarine 205. For example, platform 202 may be a mobile platform selected from one of a helicopter, a spacecraft, a train, an automobile, a tank, a personnel carrier, a surface ship, an aquatic-based vehicle, a satellite, a space station, or some other suitable type of mobile platform. Platform 202 may also be a stationary platform selected from one of a land-based structure, an aquatic-based structure, or a space-based structure. For example, platform 202 may be a bridge, a building, a wall, a pole, or some other suitable type of stationary platform.

Figure 3:
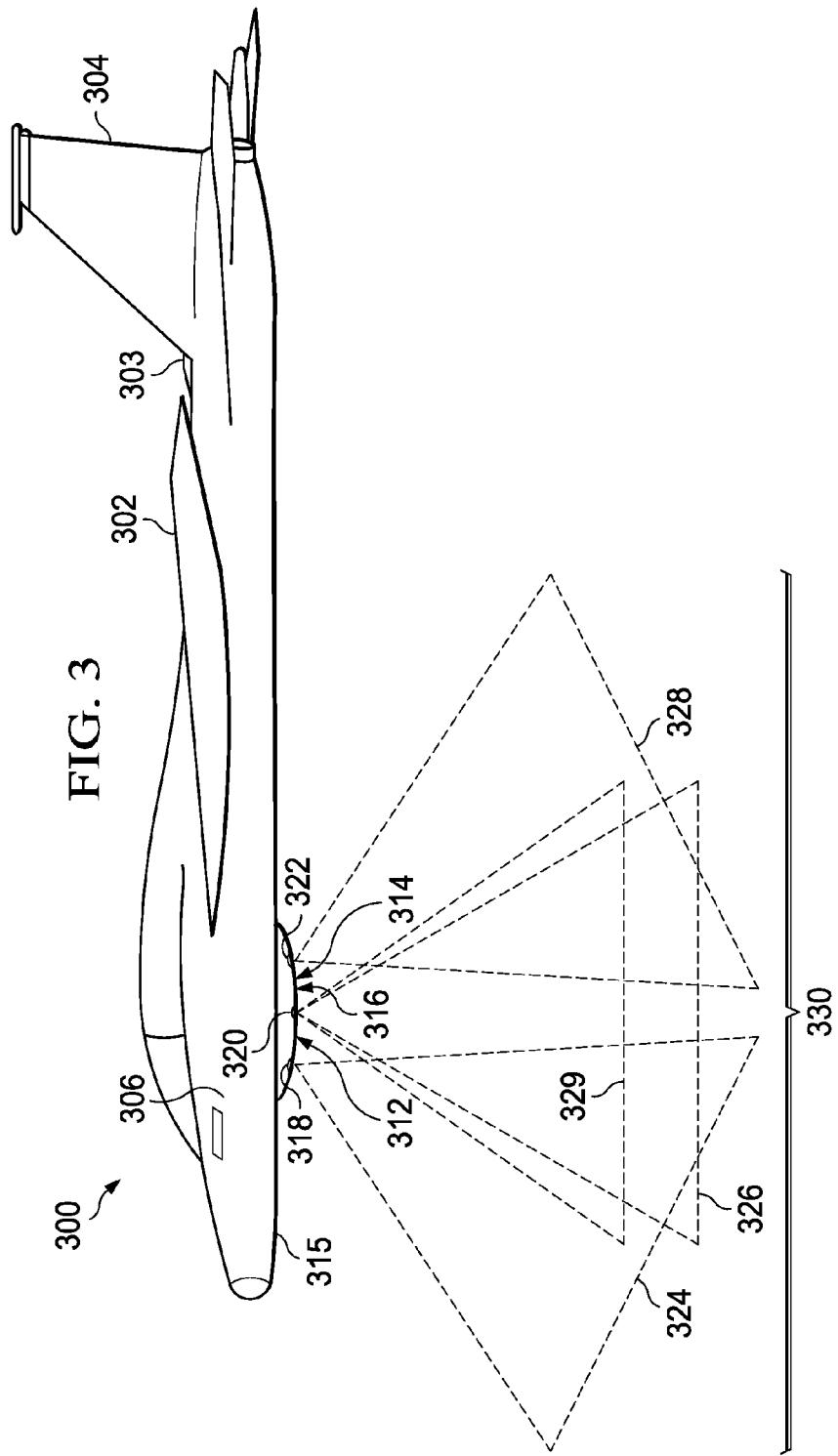
FIG. 3 is an illustration of an aircraft with a camera system in accordance with an advantageous embodiment.

With reference now to FIG. 3, an illustration of an aircraft with a camera system is depicted in accordance with an advantageous embodiment. In this illustrative example, aircraft 300 is an example of one implementation for aircraft 203 in FIG. 2. As depicted, aircraft 300 has wing 302, wing 303, and tail 304 attached to fuselage 306 of aircraft 300.

In this illustrative example, aircraft 300 has camera system 312 for generating images for an area over which aircraft 300 may fly. These images may be generated when aircraft 300 performs missions, such as, for example, surveillance and reconnaissance missions. Camera system 312 is an example of one implementation for camera system 206 in FIG. 2.

In this depicted example, camera system 312 is located in housing 314 associated with aircraft 300. Housing 314 is mounted onto bottom 315 of fuselage 306 of aircraft 300. In this depicted example, housing 314 is a part of fuselage 306 and does not substantially alter aerodynamics for fuselage 306. In other examples, housing 314 may be mounted within or may be part of a fairing attached to fuselage 306. As depicted, housing 314 is opaque and has curved shape 316.

Housing 314 has opening 318, opening 320, opening 322, and another opening (not shown in this view). These openings allow light to pass into housing 314 through one opening at a time. In other words, light is not allowed to pass into housing 314 through more than one opening at any given time. Further, housing 314 is configured such that light is not allowed to pass into housing 314 other than through one of opening 318, opening 320, opening 322, and the other opening.

Opening 318, opening 320, opening 322, and the other opening may also be referred to as pinholes. Each of these pinholes has substantially the same size in this illustrative example.

As depicted, camera system 312 has field of view 324 with opening 318, field of view 326 with opening 320, field of view 328 with opening 322, and field of view 329 with the other opening. Field of view 324, field of view 326, field of view 328, and field of view 329 form field of regard 330 for camera system 312.

Field of regard 330 is the total viewing area for which camera system 312 is able to generate images. In this illustrative example, field of regard 330 is an angular field of regard. Having opening 318 and opening 322 in addition to opening 320 increases field of regard 330 for camera system 312 as compared to just having opening 320.

In some illustrative examples, camera system 312 may have any number of openings that allow camera system 312 to have a desired angular field of regard. For example, without limitation, camera system 312 may be configured to have six openings that provide camera system 312 with field of regard 330 substantially equal to 2 pi steradians.

Figure 4:
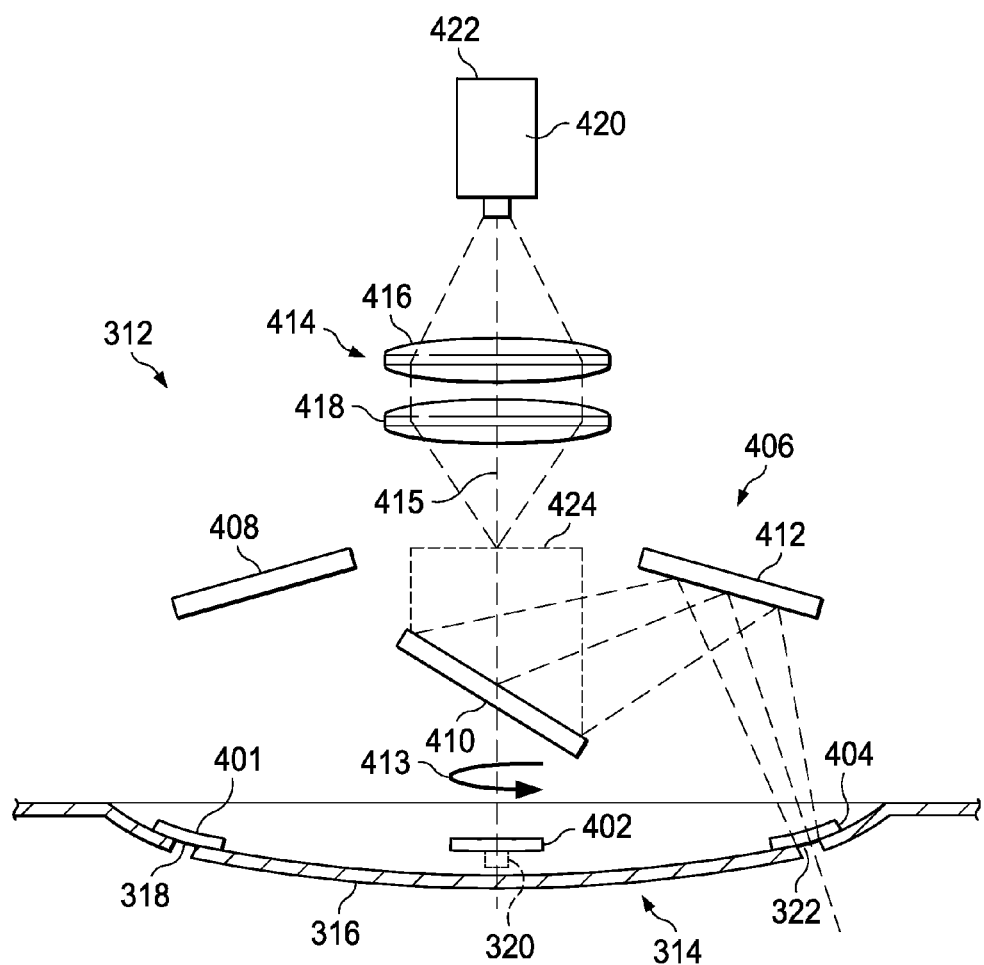
FIG. 4 is an illustration of a camera system in accordance with an advantageous embodiment.

With reference now to FIG. 4, an illustration of a camera system is depicted in accordance with an advantageous embodiment. In this illustrative example, camera system 312 in FIG. 3 is depicted in more detail. As depicted, camera system 312 is located within housing 314.

In this depicted example, camera system 312 has shutter 401 for opening 318, shutter 402 for opening 320, shutter 404 for opening 322, and another shutter (not shown in this view) for the other opening. Shutter 401, shutter 402, shutter 404, and the other shutter open and close to selectively allow light to pass through opening 318, opening 320, opening 322, and the other opening, respectively, into housing 314. In this illustrative example, only one of shutter 401, shutter 402, and shutter 404 may be open at a time. For example, when shutter 402 is open to allow light to pass through opening 320, shutter 401, shutter 404, and the other shutter are closed.

As depicted, camera system 312 also includes reflector system 406. Reflector system 406 comprises reflector 408, reflector 410, and reflector 412. Of course, in other illustrative examples, reflector system 406 may include additional reflectors. Reflector system 406 may also comprise additional reflectors not shown in this view. Each of the reflectors in reflector system 406 may be positioned at a particular distance away from axis 415. Reflector system 406 allows light entering opening 318, opening 320, and opening 322 to pass through lens system 414.

For example, light passing through opening 318 is reflected off of reflector 408 towards reflector 410. Reflector 410 may be rotated in the direction of arrow 413 to a particular position. This position allows reflector 410 to reflect the light coming from reflector 408 towards lens system 414.

In a similar manner, light passing through opening 322 is reflected off of reflector 412 towards reflector 410. Reflector 410 is rotated to a position to reflect this light towards lens system 414. Further, reflector 410 may be rotated to a position to reflect light passing through opening 320 towards lens system 414.

In this depicted example, light passing through opening 318, opening 320, and opening 322 may be optimally focused at optimum image plane 424. Optimum image plane 424 may be the plane at which the image formed by the light passing through the openings has a substantially infinite depth of focus. Optimum image plane 424 may be a plane substantially perpendicular to a centerline axis through the opening. Objects at varying distances from camera system 312 may be focused at optimum image plane 424.

For example, optimum image plane 424 may be substantially perpendicular to axis 415 through opening 320. In this manner, each of the openings may form an image at optimum image plane 424 having a substantially infinite depth of focus. Optimum image plane 424 is the plane at which the image is formed with a desired amount of detail. The distance between each of the openings and optimum image plane 424 may be determined by the wavelength of the light passing through the openings and the diameters of the openings.

In this illustrative example, lens system 414 includes lens 416 and lens 418. Lens system 414 is used to relay the image formed at optimum image plane 424 onto intensifier unit 420. Lens system 414 allows the image formed at optimum image plane 424 to be placed at an input of intensifier unit 420 of camera system 312 without a loss of the depth of field. The depth of field is the portion of the area for which the image is generated that has a desired sharpness in the image.

Further, intensifier unit 420 may not have the surface area at the input of intensifier unit 420 needed to capture substantially the entire image at optimum image plane 424. Lens system 414 allows substantially the entire image formed at optimum image plane 424 to be placed at the input of intensifier unit 420.

With this type of configuration for camera system 312, manual and/or automatic adjustments to camera system 312 are not needed to focus the images generated by camera system 312. In other words, objects at varying distances from camera system 312 may be focused at optimum image plane 424.

In this illustrative example, lens system 414 may be placed at a particular distance from opening 318, opening 320, and opening 322. The shape of surface 316 of housing 314 is selected to allow this particular distance to be substantially equal between lens system 414 and each of opening 318, opening 320, and opening 322.

Further, this particular distance is selected to provide an optimum focal length for opening 318, opening 320, and opening 322. At the optimum focal length, camera system 312 may generate an image with a substantially infinite depth of focus. Further, camera system 312 may generate an image with a reduced amount of blurring. The optimal focal length is given by:

$$f = d^2/k\lambda \qquad (2)$$

where f is the optimal focal length, d is the diameter of the openings, k is a constant, and $\lambda$ is a wavelength of light. The value of the constant, k, may be selected between about two and about four, depending on the criteria used for resolution. For maximum resolution, the value of k may be selected as three.

In this illustrative example, light passes through lens system 414 to intensifier unit 420 and then to image detection device 422. Image detection device 422 generates a digital image for at least a portion of the light that passed through one of opening 318, opening 320, and opening 322. The digital image generated contains pixels. These pixels are obtained by the different signals generated by image detection device 422.

Figure 5:
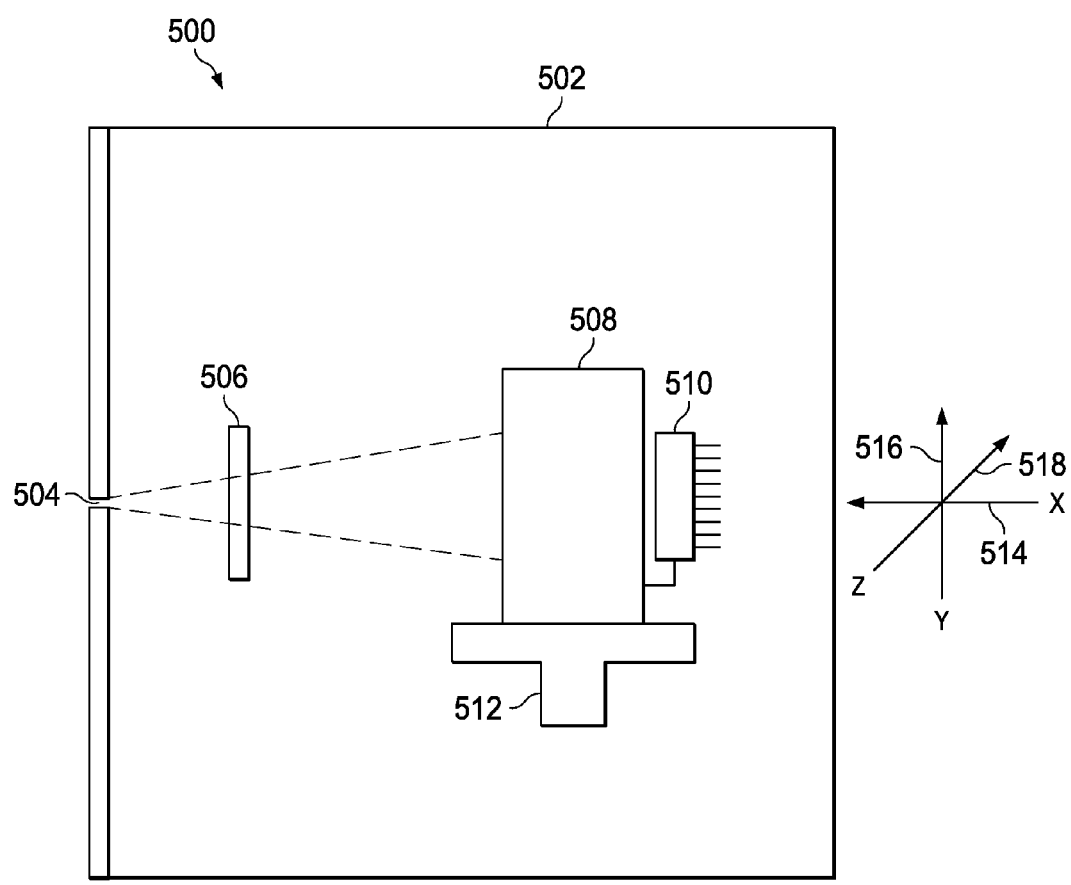
FIG. 5 is an illustration of a camera system in accordance with an advantageous embodiment.

With reference now to FIG. 5, an illustration of a camera system is depicted in accordance with an advantageous embodiment. In this illustrative example, camera system 500 is an example of one implementation for camera system 206 in FIG. 2.

As depicted, camera system 500 is in housing 502. Housing 502 is stabilized using a gyroscopic system in this illustrative example. Housing 502 may be attached to a platform, such as platform 202 in FIG. 2. Housing 502 has opening 504 to allow light to pass inside housing 502. Opening 504 has a diameter given by equation (1) described above.

In this illustrative example, camera system 500 includes filter system 506, intensifier unit 508, and image detection system 510. Filter system 506 may be placed inside housing 502 between opening 504 and intensifier unit 508 as needed. Filter system 506 may include a number of color filters, a number of neutral density filters, or some combination of the two.

For example, filter system 506 may include a neutral density filter when camera system 500 is generating images of bright objects. Filter system 506 may include a number of color filters when filter system 506 is used to filter for a specific color or a specific range of wavelengths when generating images using camera system 500.

As depicted, stage 512 is also located inside housing 502. Intensifier unit 508 and image detection system 510 are mounted onto stage 512 in this illustrative example. Stage 512 allows intensifier unit 508 and image detection system 510 to be moved and/or positioned together in the directions of x-axis 514, y-axis 516, and z-axis 518. Moving stage 512 in the direction of x-axis 514 provides a zoom capability for the image placed at intensifier unit 508.

Moving stage 512 in the directions of y-axis 516 and/or z-axis 518 provides a pan capability for the image placed at intensifier unit 508. Image detection system 510 moves with intensifier unit 508 such that image detection system 510 does not need to be refocused when intensifier unit 508 is moved to zoom and/or pan.

The different advantageous embodiments recognize and take into account that, typically, currently available intensifier units and charge coupled device systems generate images that are monochromatic. However, most objects are multi-colored. In these advantageous embodiments, filters may be positioned between the opening of the housing for the camera system and a number of intensifier units. These filters may be used to filter for different colors of light that are received by a number of intensifier units. The images produced by the number of intensifier units may be processed to produce a colored image.

Figure 6:
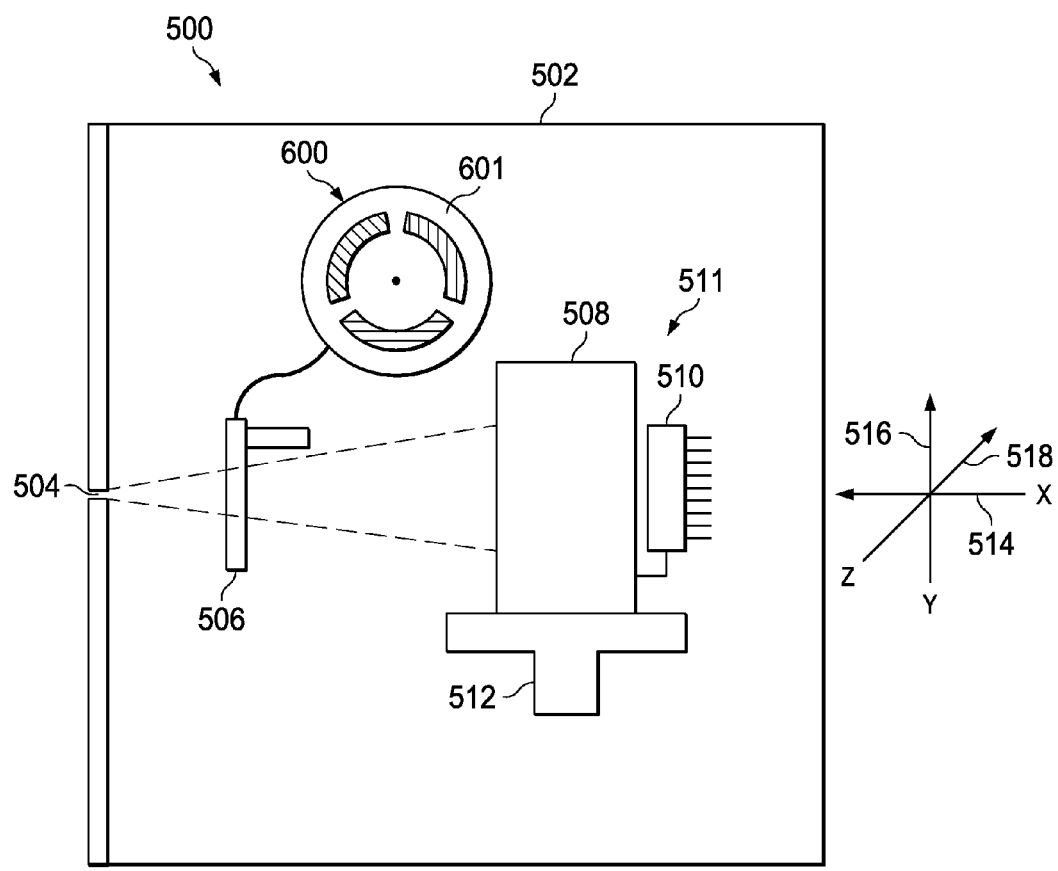
FIG. 6 is an illustration of a camera system in accordance with an advantageous embodiment.

With reference now to FIG. 6, an illustration of a camera system is depicted in accordance with an advantageous embodiment. In this illustrative example, camera system 500 in FIG. 5 is depicted with filter wheel 600. In this illustrative example, filter wheel 600 is color filter wheel 601.

Color filter wheel 601 is synchronized to the frame rate for camera system 500. Color filter wheel 601 is used with filter system 506 to allow camera system 500 to generate color images. For example, a data processing system (not shown) within camera system 500 may be used to process the images generated by camera system 500 to form a fused color image.

Figure 7:
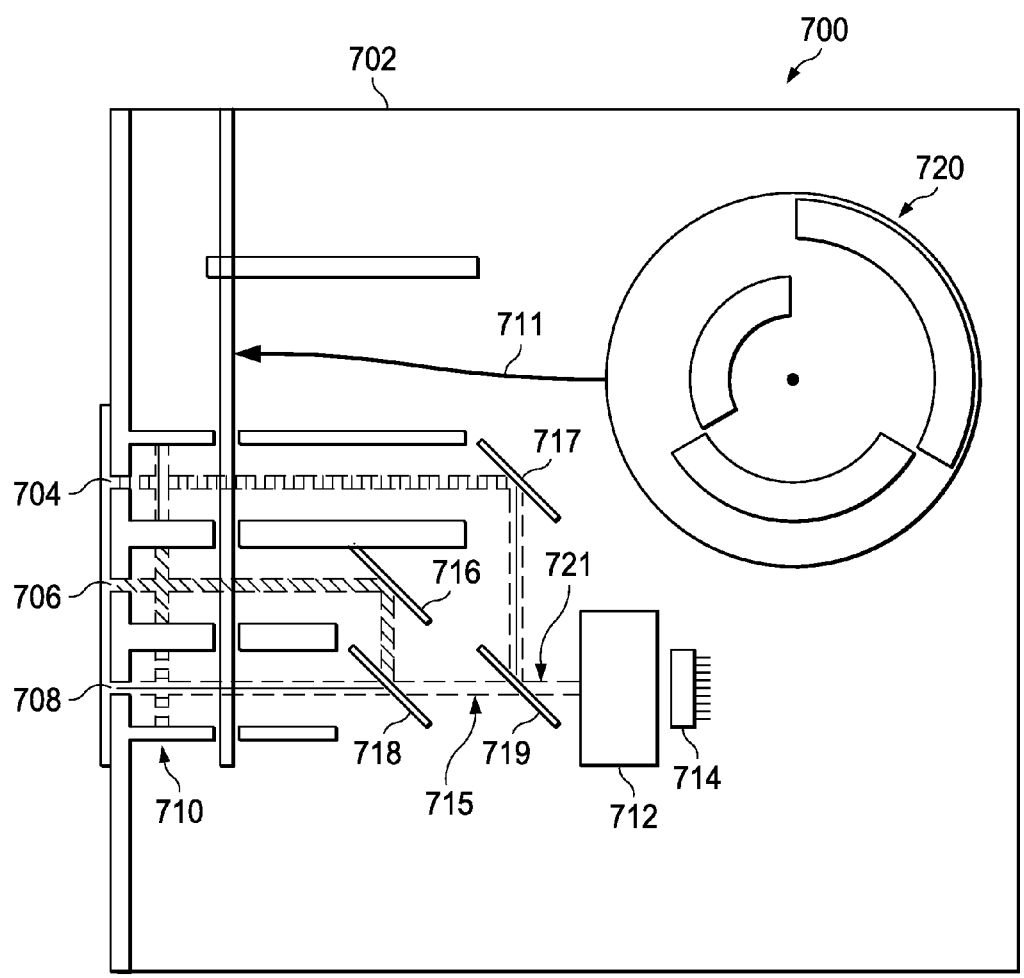
FIG. 7 is an illustration of a camera system in accordance with an advantageous embodiment.

With reference now to FIG. 7, an illustration of a camera system is depicted in accordance with an advantageous embodiment. In this illustrative example, camera system 700 is an example of one implementation for camera system 206 in FIG. 2.

As depicted, camera system 700 is located in housing 702. Housing 702 has opening 704, opening 706, and opening 708 to allow light to pass into housing 702. Camera system 700 includes filter system 710, intensifier unit 712, image detection system 714, and shutter system 711.

Filter system 710 includes a number of color filters such that each filter allows only light of substantially a selected wavelength to pass. For example, filter system 710 is configured to allow only red light entering through opening 704, green light entering through opening 706, and blue light entering through opening 708 to pass through filter system 710.

Shutter system 711 allows only one beam of light to be received at intensifier unit 712 at a time. In this illustrative example, shutter system 711 takes the form of optical chopper system 720.

Optical chopper system 720 is synchronized to the frame rate of camera system 700. Optical chopper system 720 only allows one color of light to enter housing 702 at a time. For example, optical chopper system 720 is comprised of shutters that open one at a time to allow light of one color to pass into housing 702.

Further, camera system 700 also includes light directing system 715. Light directing system 715 includes mirror 716, mirror 717, beam combiner 718, and beam combiner 719. Beam combiner 718 and beam combiner 719 may take the form of pellicle beam combiners in this illustrative example.

The beam of light entering through opening 708 follows path 721 through beam combiner 718 and towards intensifier unit 712. Additionally, mirror 716 reflects the beam of light entering through opening 706 towards beam combiner 718. Beam combiner 718 directs this beam of light that entered through opening 706 along path 721. The beam of light entering through opening 704 is reflected off of mirror 717 towards beam combiner 719. Beam combiner 719 directs this beam of light along path 721.

In this manner, light directing system 715 is configured to direct the different beams of light entering through the openings of housing 702 along path 721 to the input of intensifier unit 712. In this manner, each beam of light has substantially the same direction and angle when received by the input of intensifier unit 712.

In the different illustrative examples, intensifier unit 712 forms a monochromatic image. The monochromatic image provides information about the type of light used to form the monochromatic image.

For example, when red light is received by intensifier unit 712 and used to form an image, the different intensities of light at different locations in the image generated by intensifier unit 712 provide information for the intensity of red light at those locations in the image. This image may be referred to as a red-encoded image. In a similar manner, intensifier unit 712 generates a green-encoded image when green light is received and a blue-encoded image when blue light is received.

The red-encoded image, green-encoded image, and blue-encoded image may be detected by image detection system 714 and converted into digital images. These digital images may then be processed using, for example, a computer system, to create a multicolor image.

Figure 8:
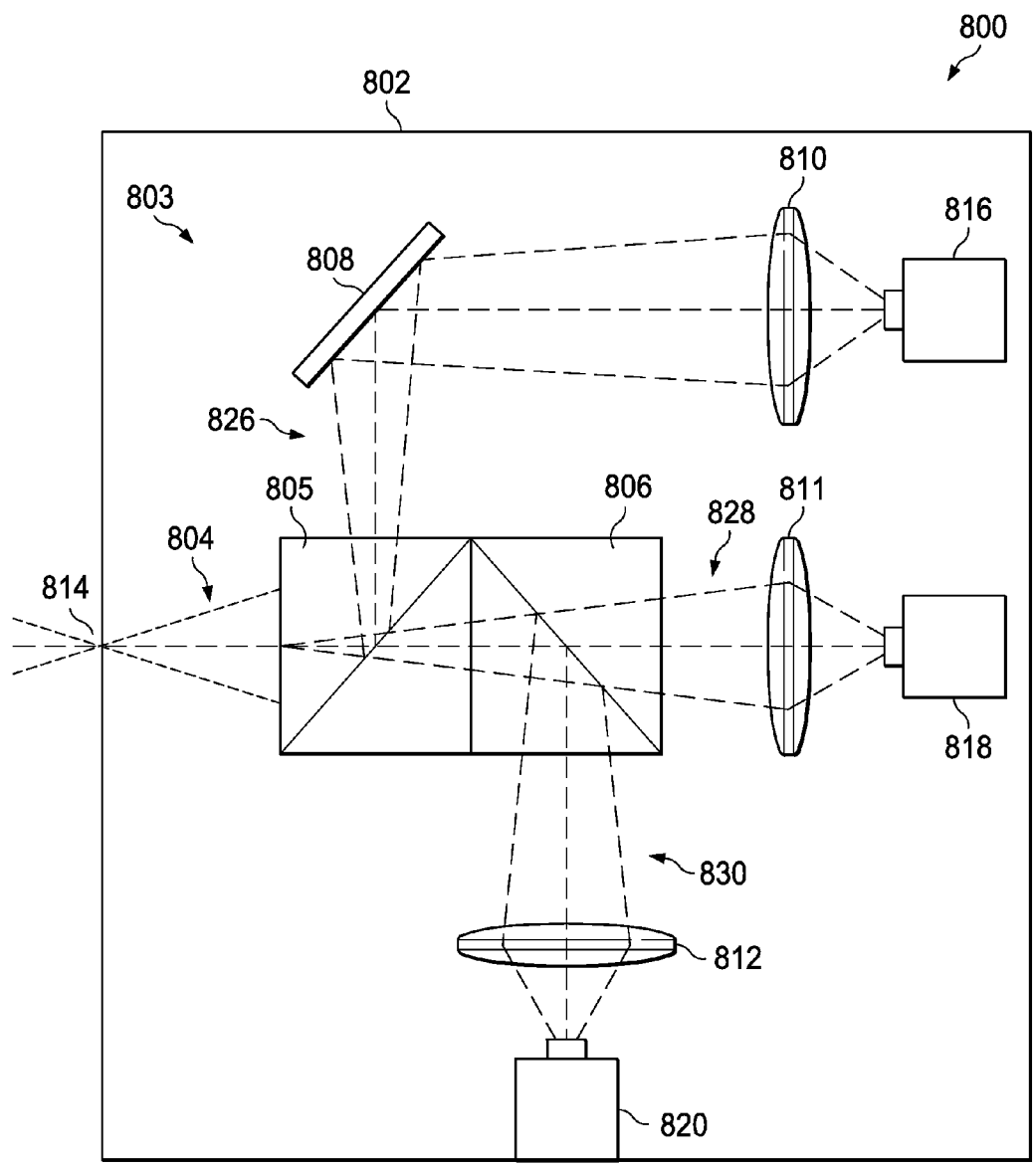
FIG. 8 is an illustration of a camera system for generating color images in accordance with an advantageous embodiment.

With reference now to FIG. 8, an illustration of a camera system for generating color images is depicted in accordance with an advantageous embodiment. In this illustrative example, camera system 800 is an example of one implementation for camera system 206 in FIG. 2. As depicted, camera system 800 is located within housing 802.

In this illustrative example, camera system 800 includes light directing system 803, lens 810, lens 811, lens 812, image detection system 816, image detection system 818, and image detection system 820. Image detection system 816, image detection system 818, and image detection system 820 includes an intensifier unit, such as intensifier unit 210 in FIG. 2, and an image recording device, such as one of plurality of image detection devices 242 in FIG. 2.

In this example, light directing system 803 includes beam splitter 805, beam splitter 806, and mirror 808. Beam splitter 805 and beam splitter 806 take the form of dichroic beam splitters in this example. Light 804 entering housing 802 through opening 814 may be split into different beams of light by beam splitter 805 and beam splitter 806 based on wavelength. In particular, beam splitter 805 and beam splitter 806 splits light 804 into three different colors. Light 804 is split into red beam of light 826, green beam of light 828, and blue beam of light 830.

As depicted, red beam of light 826 is reflected off of mirror 808 and towards lens 810. Red beam of light 826 passes through lens 810 and is received by image detection system 816. Green beam of light 828 passes through lens 811 and is received by image detection system 818. Blue beam of light 830 passes through lens 812 and is received by image detection system 820.

In this manner, image detection system 816 may generate a red-encoded image, image detection system 818 may generate a green-encoded image, and image detection system 820 may generate a blue-encoded image. These images may then be processed using a computer system to form a multicolor image. This multicolor image may also be referred to as a fused-color image. This fused-color image may have substantially the same colors as the colors of the objects in the field of view of camera system 800 in this illustrative example.

Figure 9:
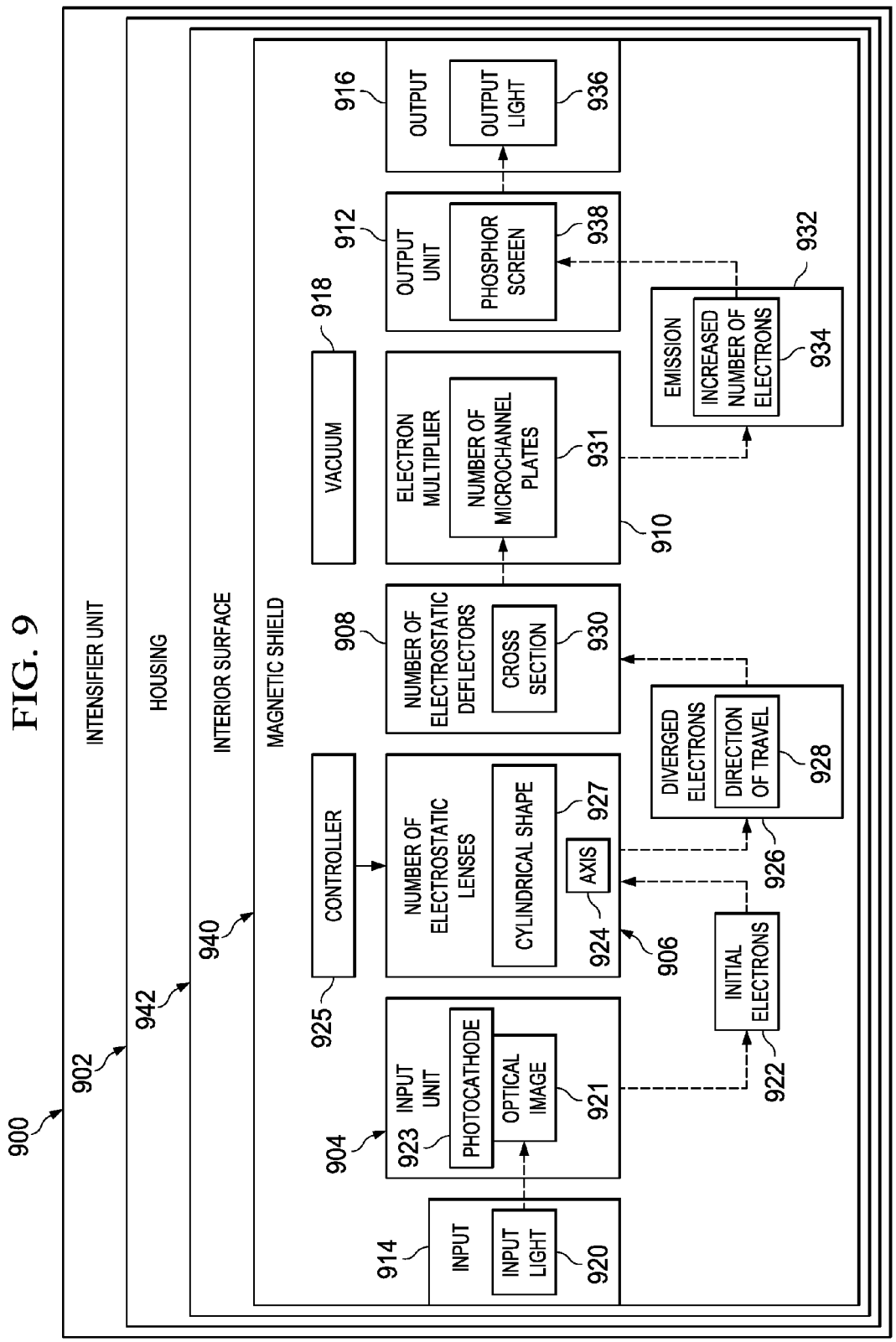
FIG. 9 is an illustration of an intensifier unit in accordance with an advantageous embodiment.

With reference now to FIG. 9, an illustration of an intensifier unit is depicted in accordance with an advantageous embodiment. In this illustrative example, intensifier unit 900 is an example of one implementation for intensifier unit 104 in FIG. 1 and/or intensifier unit 210 in FIG. 2.

As depicted, intensifier unit 900 comprises housing 902, input unit 904, number of electrostatic lenses 906, number of electrostatic deflectors 908, electron multiplier 910, and output unit 912. Input unit 904, number of electrostatic lenses 906, number of electrostatic deflectors 908, electron multiplier 910, and output unit 912 are located in housing 902.

In this illustrative example, housing 902 has input 914 and output 916. Further, housing 902 is configured to provide vacuum 918 inside housing 902. Input 914 of housing 902 receives input light 920. Input light 920 may be received from a camera system, such as pinhole camera system 101 in FIG. 1 and/or camera system 206 in FIG. 2. Input light 920 is comprised of photons.

Input unit 904 in housing 902 receives input light 920 received at input 914 of housing 902. Input unit 904 in housing 902 converts input light 920 received at input 914 into initial electrons 922. In this illustrative example, input unit 904 is comprised of photocathode 923. Photocathode 923 is a photosensitive material with an applied negative charge. The photosensitive material may be a thin film comprising a mixture of, for example, gallium and arsenic.

Input light 920 received at input unit 904 forms optical image 921 in focus on photocathode 923. Photocathode 923 in input unit 904 absorbs energy from input light 920 received at input unit 904. The absorption of energy from input light 920 causes a conversion of the photons in input light 920 into initial electrons 922. This conversion of photons into electrons occurs due to the photoelectric effect. The photoelectric effect occurs when electrons are emitted from matter in response to the absorption of energy from electromagnetic radiation of light. Initial electrons 922 may also be referred to as photoelectrons.

In some illustrative examples, photocathode 923 may be cooled to below a selected temperature to reduce an occurrence of thermal electrons. Thermal electrons may be generated by ambient heat around intensifier unit 900 and/or by the operation of intensifier unit 900.

Initial electrons 922 are emitted from photocathode 923 in input unit 904 towards number of electrostatic lenses 906. Number of electrostatic lenses 906 cause initial electrons 922 generated by input unit 904 to diverge from axis 924 to form diverged electrons 926. Axis 924 is a center axis through number of electrostatic lenses 906 in this example.

In this illustrative example, each of number of electrostatic lenses 906 may have cylindrical shape 927. Further, cylindrical shape 927 for each of number of electrostatic lenses 906 may be symmetrical around axis 924. In some illustrative examples, cylindrical shape 927 may have an opening.

Controller 925 may be used to control number of electrostatic lenses 906 to control the amount of divergence for diverged electrons 926. In this illustrative example, controller 925 controls a voltage applied across each of number of electrostatic lenses 906. The amount of divergence for diverged electrons 926 is determined by the voltage difference between number of electrostatic lenses 906.

The amount of divergence for diverged electrons 926 corresponds to an amount of zooming for optical image 921 in focus on photocathode 923. The greater the divergence for diverged electrons 926, the greater the amount of zooming for optical image 921.

In this illustrative example, number of electrostatic deflectors 908 may take the form of a number of electrostatic deflector plates. Number of electrostatic deflectors 908 is positioned to cause a change in direction of travel 928 of diverged electrons 926 from number of electrostatic lenses 906 to electron multiplier 910 and output unit 912 in housing 902. Direction of travel 928 is relative to axis 924.

In this depicted example, number of electrostatic deflectors 908 change direction of travel 928 in substantially perpendicular directions. The change to direction of travel 928 is determined by the voltage applied to number of electrostatic deflectors 908. The change to direction of travel 928 changes which electrons in diverged electrons 926 reach electron multiplier 910. In this manner, optical image 921 in focus on photocathode 923 is shifted in substantially perpendicular directions.

Controller 925 may be used to control number of electrostatic deflectors 908 to control the change to direction of travel 928. In this illustrative example, controller 925 controls the voltage applied across each of number of electrostatic deflectors 908. The change to direction of travel 928 may be determined by the voltage difference between number of electrostatic deflectors 908.

In this illustrative example, number of electrostatic deflectors 908 has cross section 930. Cross section 930 may be selected from one of, for example, a regular quadrilateral, a square, a hexagon, an octagon, or some other suitable regular polygonal shape.

In this illustrative example, electron multiplier 910 is comprised of number of microchannel plates 931. As depicted, number of microchannel plates 931 in electron multiplier 910 receives at least a portion of diverged electrons 926 after number of electrostatic deflectors 908. When an electron in the portion of electrons hits a wall of a channel in a microchannel plate in number of microchannel plates 931, a plurality of electrons are emitted. This emission of the plurality of electrons may be referred to as electron gain.

In this manner, number of microchannel plates 931 causes emission 932 of increased number of electrons 934 from electron multiplier 910. In other words, electron multiplier 910 causes an increased number of electrons to reach output unit 912. Increased number of electrons 934 provides optical image 921 in focus on photocathode 923 with an increased intensity at output unit 912. In this manner, images that are generated in low lighting conditions may be generated by output unit 912 with an increased intensity such that the images may provide a greater amount of information.

Output unit 912 is comprised of phosphor screen 938 in this illustrative example. Phosphor screen 938 is comprised of a material, such as, for example, a rare-earth oxide, halide, and/or some other suitable material. Phosphor screen 938 converts increased number of electrons 934 received at output unit 912 into output light 936. Output light 936 is comprised of photons. For example, phosphor screen 938 may convert each electron into about 20 to about 200 photons. Output light 936 exits output 916 of housing 902.

Output light 936 may exit output 916 towards an image detection system, such as image detection system 212 in FIG. 2.

In this illustrative example, housing 902 has magnetic shield 940. Magnetic shield 940 is associated with interior surface 942 of housing 902. Magnetic shield 940 may be comprised of a material, such as, for example, a nickel-iron alloy. The nickel-iron alloy may be a mu-metal. Magnetic shield 940 reduces deflection of the electrons traveling in housing 902 caused by static magnetic fields and/or low-frequency magnetic fields.

The illustration of intensifier unit 900 in FIG. 9 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 10:
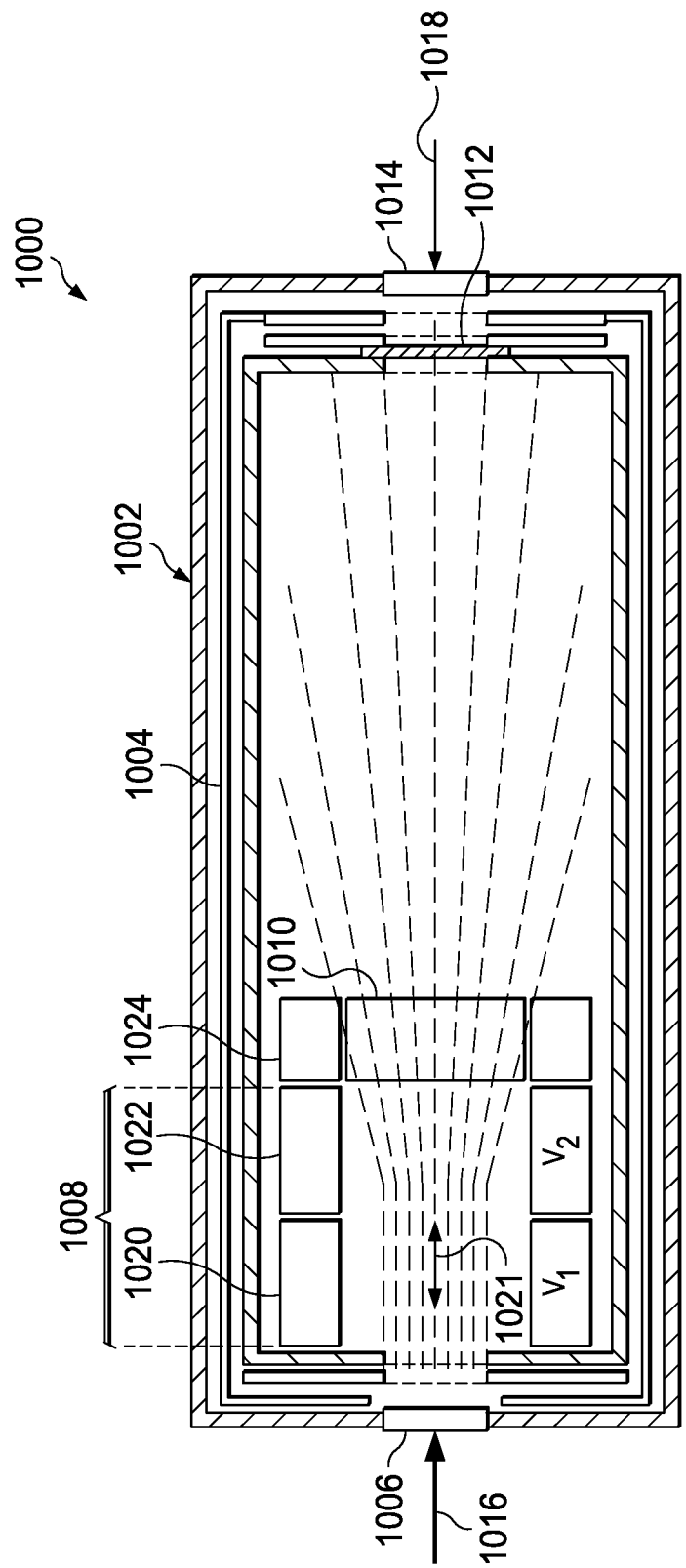
FIG. 10 is an illustration of a cross section of an intensifier unit in accordance with an advantageous embodiment.

With reference now to FIG. 10, an illustration of a cross section of an intensifier unit is depicted in accordance with an advantageous embodiment.

In this illustrative example, intensifier unit 1000 is an example of one implementation for intensifier unit 900 in FIG. 9, intensifier unit 104 in FIG. 1 and/or intensifier unit 210 in camera system 206 in FIG. 2.

In other illustrative examples, intensifier unit 1000 may be used with a different type of camera system other than camera system 206. More specifically, intensifier unit 1000 may be used with camera systems other than pinhole camera systems.

As depicted, intensifier unit 1000 includes housing 1002, magnetic shield 1004, input unit 1006, number of electrostatic lenses 1008, number of electrostatic deflectors 1010, electron multiplier 1012, and output unit 1014. Housing 1002 provides a vacuum inside of housing 1002.

In this illustrative example, magnetic shield 1004 is associated with the interior surface of housing 1002. Magnetic shield 1004 may be comprised of a nickel-iron alloy, such as a mu-metal.

Housing 1002 has input 1016 and output 1018. Light is received at input 1016 of housing 1002. Light received at input 1016 is received at input unit 1006. Input unit 1006 is comprised of a photocathode in this example. Input unit 1006 converts the photons in the light received at input unit 1006 into electrons. These electrons travel towards number of electrostatic lenses 1008.

Number of electrostatic lenses 1008 includes electrostatic lens 1020 and electrostatic lens 1022. Different voltages are applied to electrostatic lens 1020 and electrostatic lens 1022. The different voltages may be applied to number of electrostatic lenses 1008 by a controller, such as controller 925 in FIG. 9.

The potential difference between electrostatic lens 1020 and electrostatic lens 1022 causes the electrons to diverge away from axis 1021 to form diverged electrons. Axis 1021 is a centerline axis through number of electrostatic lenses 1008. Further, axis 1021 may be defined as the z-axis in this illustrative example.

The divergence of the electrons provides a zoom capability. The amount of zooming increases as the amount of divergence of the electrons increases. These diverged electrons travel towards number of electrostatic deflectors 1010.

As depicted, number of electrostatic deflectors 1010 includes electrostatic deflector 1024. Number of electrostatic deflectors 1010 causes a change in the direction of travel for at least a portion of the diverged electrons. In this example, number of electrostatic deflectors 1010 causes at least a portion of the diverged electrons to shift substantially perpendicularly. For example, the diverged electrons may be shifted in the directions of an x-axis and/or a y-axis. An increase in the voltage applied to number of electrostatic deflectors 1010 causes a change in the direction of travel for the diverged electrons.

The shifting of the electrons provides a pan capability. In other words, the optical image in focus on input unit 1006 may be panned using number of electrostatic deflectors 1010.

The diverged electrons then travel towards electron multiplier 1012. Electron multiplier 1012 takes the form of a microchannel plate in this illustrative example. Electron multiplier 1012 amplifies the number of electrons emitted from the photocathode of input unit 1006. In other words, electron multiplier 1012 causes additional electrons to be emitted in response to receiving the diverged electrons at electron multiplier 1012.

The increased number of electrons is received at output unit 1014. Output unit 1014 takes the form of a phosphor screen in this illustrative example. Output unit 1014 converts the increased number of electrons into photons. These photons form light that exits output 1018 of housing 1002.

The intensity of the light that exits output 1018 of housing 1002 has a greater intensity than the light received at input 1016. This greater intensity for the light exiting output 1018 results from the additional electrons emitted by electron multiplier 1012.

Figure 11:
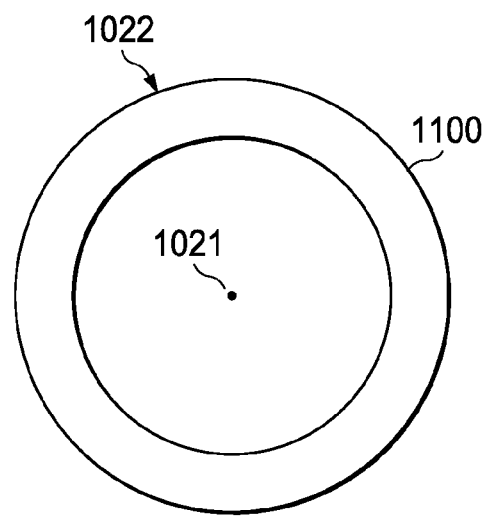
FIG. 11 is an illustration of a cross section of an electrostatic lens in accordance with an advantageous embodiment.

With reference now to FIG. 11, an illustration of a cross section of an electrostatic lens is depicted in accordance with an advantageous embodiment. In this depicted example, a cross section of electrostatic lens 1022 in FIG. 10 is illustrated. As depicted, electrostatic lens 1022 has cylindrical shape 1100. In other advantageous embodiments, electrostatic lens 1022 may have other shapes.

Figure 12:
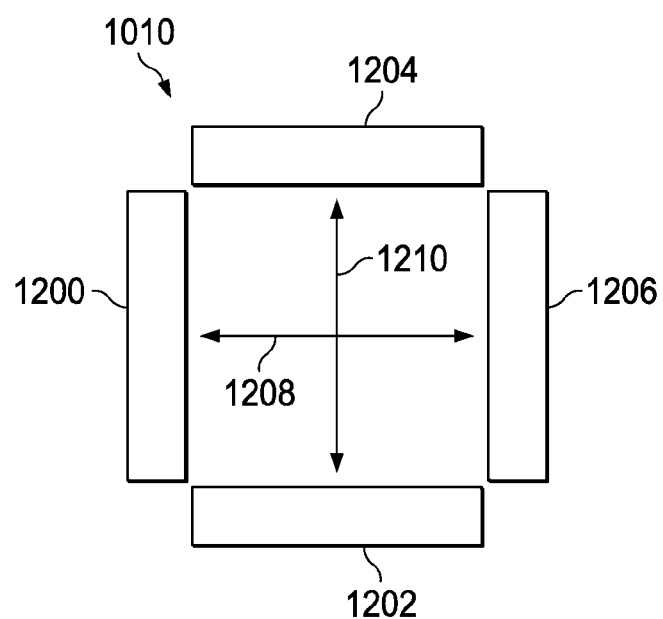
FIG. 12 is an illustration of an end view of a number of electrostatic deflectors in an intensifier unit in accordance with an advantageous embodiment.

With reference now to FIG. 12, an illustration of an end view of a number of electrostatic deflectors in an intensifier unit is depicted in accordance with an advantageous embodiment. In this depicted example, number of electrostatic deflectors 1010 in intensifier unit 1000 in FIG. 10 is illustrated.

Number of electrostatic deflectors 1010 takes the form of a number of electrostatic deflector plates. For example, number of electrostatic deflectors 1010 includes electrostatic deflector plate 1200, electrostatic deflector plate 1202, electrostatic deflector plate 1204, and electrostatic deflector plate 1206.

As depicted, number of electrostatic deflectors 1010 is arranged in a square. Each edge of the square is formed by an electrostatic deflector plate. Each electrostatic deflector plate may have a voltage applied to the electrostatic deflector plate in this illustrative example. In this example, the voltages applied to the electrostatic deflector plates may be different or substantially the same.

In other illustrative examples, number of electrostatic deflectors 1010 may be arranged in some other suitable polygonal shape. The polygonal shape may be selected from one of, for example, without limitation, a regular quadrilateral, a hexagon, an octagon, or some other suitable regular polygonal shape. Further, each edge of the polygonal shape may be formed by an electrostatic deflector plate.

In this illustrative example, number of electrostatic deflectors 1010 provides a panning capability in the direction of x-axis 1208 and the direction of y-axis 1210.

Figure 13:
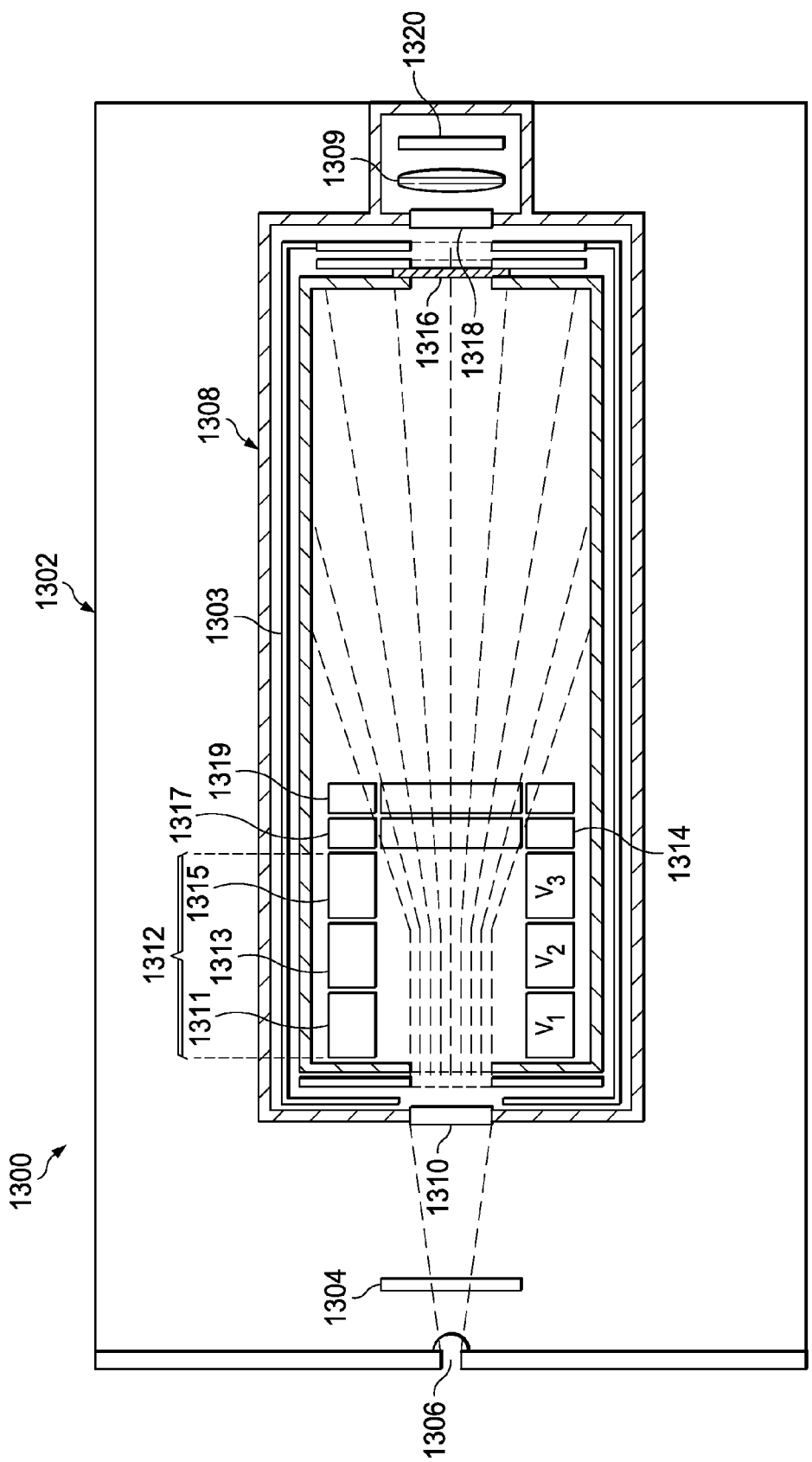
FIG. 13 is an illustration of a camera system in accordance with an advantageous embodiment.

With reference now to FIG. 13, an illustration of a camera system is depicted in accordance with an advantageous embodiment. In this illustrative example, camera system 1300 is an example of one implementation for camera system 100 in FIG. 1 and/or camera system 206 in FIG. 2.

In this illustrative example, camera system 1300 is located in housing 1302. Housing 1302 has opening 1306 to allow light to enter housing 1302. Housing 1302 is configured to not allow any light to pass inside of housing 1302 other than through opening 1306.

As depicted, camera system 1300 includes filter system 1304, intensifier unit 1308, optical lens system 1309, and digital image generation system 1312. The light entering housing 1302 through opening 1306 may be filtered by wavelength and/or intensity using filter system 1304 to form filtered light. This filtered light is received at intensifier unit 1308.

In this illustrative example, intensifier unit 1308 includes input unit 1310, number of electrostatic lenses 1312, number of electrostatic deflectors 1314, electron multiplier 1316, and output unit 1318. Further, intensifier unit 1308 has magnetic shield 1303.

The light filtered by filter system 1304 is received by input unit 1310 in intensifier unit 1308.

Input unit 1310 converts the photons comprising the light received by input unit 1310 into electrons. Number of electrostatic lenses 1312 causes these electrons to diverge as the electrons travel through intensifier unit 1308. This divergence is caused by the differences in the voltages applied to number of electrostatic lenses 1312.

As depicted, number of electrostatic lenses 1312 has a greater number of electrostatic lenses as compared to number of electrostatic lenses 1008 in FIG. 10. Number of electrostatic lenses 1312 includes electrostatic lens 1311, electrostatic lens 1313, and electrostatic lens 1315.

The additional electrostatic lens in number of electrostatic lenses 1312 reduces undesired electro-optical aberrations in the image being generated as compared to number of electrostatic lenses 1008 in FIG. 10.

Number of electrostatic deflectors 1314 causes a change in the direction of travel of the diverged electrons. As depicted, number of electrostatic deflectors 1314 includes a greater number of electrostatic deflectors as compared to number of electrostatic deflectors 1010 in FIG. 10.

As depicted, number of electrostatic deflectors 1314 includes set of electrostatic deflector plates 1317 and set of electrostatic deflector plates 1319. Set of electrostatic deflector plates 1317 and set of electrostatic deflector plates 1319 each comprise four electrostatic deflector plates. The four electrostatic deflector plates are arranged in a square.

In this illustrative example, set of electrostatic deflector plates 1317 and set of electrostatic deflector plates 1319 may be configured to allow panning in the direction of the x-axis and the direction of the y-axis. Further, different voltages may be applied to set of electrostatic deflector plates 1317 and set of electrostatic deflector plates 1319. In some illustrative examples, different voltages may be applied to the different deflector plates in set of electrostatic deflector plates 1317 and/or set of electrostatic deflector plates 1319.

The electrons are then received at electron multiplier 1316. Electron multiplier 1316 emits additional electrons when the electrons strike electron multiplier 1316 to form an increased number of electrons. The increased number of electrons is received at output unit 1318. Output unit 1318 converts these electrons into photons in the form of light. In this example, output unit 1318 takes the form of a phosphor screen.

In this depicted example, the light generated by output unit 1318 exits intensifier unit 1308 and passes through optical lens system 1309 to image detection system 1320. Optical lens system 1309 focuses the light exiting output unit 1318 onto image detection system 1320. Image detection system 1320 generates a digital image in response to receiving the light from optical lens system 1309.

Figure 14:
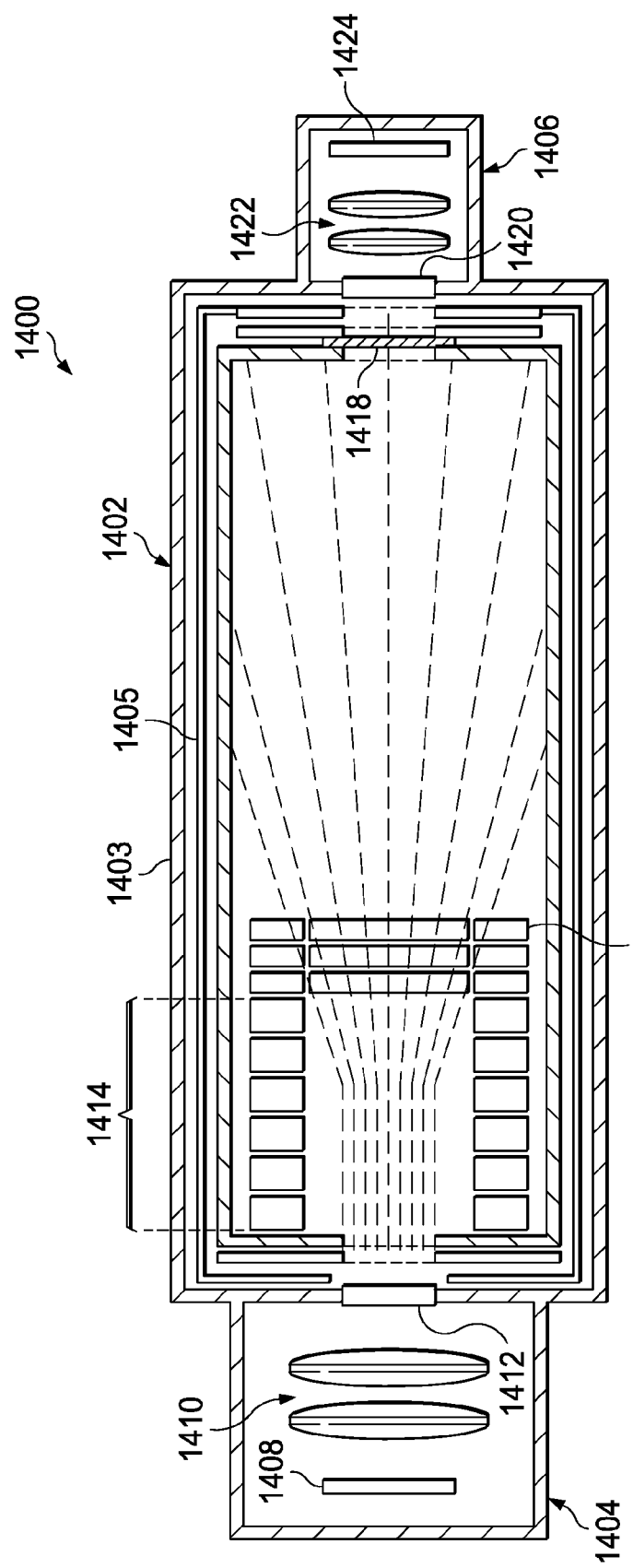
FIG. 14 is an illustration of a telescope in accordance with an advantageous embodiment.

With reference now to FIG. 14, an illustration of a telescope is depicted in accordance with an advantageous embodiment. In this illustrative example, telescope 1400 includes intensifier unit 1402, fixed lens imaging system 1404, and image detection system 1406. Intensifier unit 1402 may be implemented using intensifier unit 1100 in FIG. 11.

Fixed lens imaging system 1404 may include filter 1408 and lens system 1410. Light passes through fixed lens imaging system 1404 to input unit 1412 of intensifier unit 1402. Fixed lens imaging system 1404 is configured to allow an optical image to be focused on input unit 1412. Lens system 1410 of fixed lens imaging system 1404 focuses objects onto input unit 1412.

In this illustrative example, intensifier unit 1402 has housing 1403. Housing 1403 provides a vacuum inside of housing 1403. Housing 1403 includes magnetic shield 1405. Further, intensifier unit 1402 includes number of electrostatic lenses 1414, number of electrostatic deflectors 1416, electron multiplier 1418, and output unit 1420 in addition to input unit 1412 located in housing 1403.

As depicted, number of electrostatic lenses 1414 has a greater number of electrostatic lenses as compared to number of electrostatic lenses 1008 in FIG. 10 and number of electrostatic lenses 1312 in FIG. 13. Further, number of electrostatic deflectors 1416 has a greater number of electrostatic deflectors as compared to number of electrostatic deflectors 1010 in FIG. 10 and number of electrostatic deflectors 1314 in FIG. 13.

The greater number of electrostatic lenses and electrostatic deflectors allows an ability to zoom and pan the optical image focused on input unit 1412. Further, the greater number of electrostatic lenses and electrostatic deflectors reduces undesired effects and inconsistencies in the electrons being relayed to electron multiplier 1418.

Electron multiplier 1418 emits an increased number of electrons. This increased number of electrons is received at output unit 1420. Output unit 1420 takes the form of a phosphor screen in this example. Output unit 1420 converts the increased number of electrons into photons in the form of light.

The light generated by output unit 1420 exits housing 1403 for intensifier unit 1402 and enters image detection system 1406. Image detection system 1406 includes lens system 1422 and charge coupled device system 1424.

Lens system 1422 may take the form of an eyepiece for telescope 1400 in this example. Lens system 1422 may be used to further focus the light onto charge coupled device system 1424.

Charge coupled device system 1424 converts the photons comprising the light into electrical signals to form a digital image. The digital image produced by image detection system 1406 may be displayed on a display device, such as a computer monitor.

Figure 15:
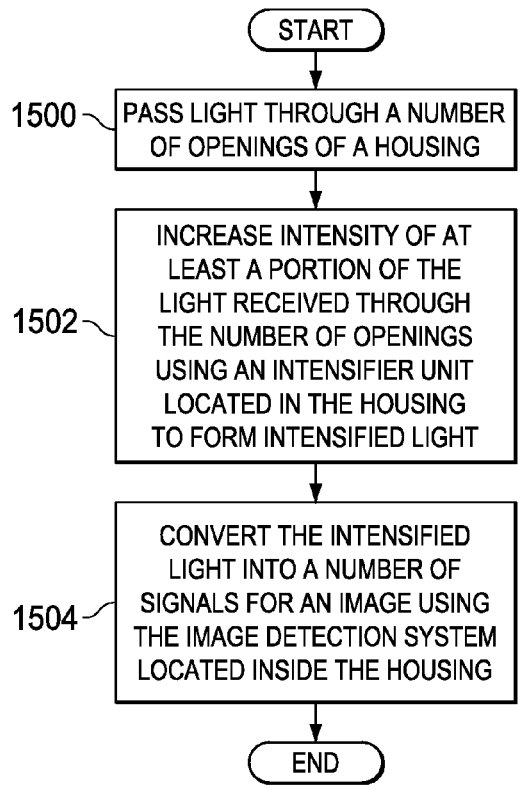
FIG. 15 is an illustration of a flowchart of a process for generating an image in accordance with an advantageous embodiment.

With reference now to FIG. 15, an illustration of a flowchart of a process for generating an image is depicted in accordance with an advantageous embodiment. The process illustrated in FIG. 15 may be implemented in imaging environment 200 in FIG. 2. In particular, the process may be implemented using camera system 206 in FIG. 2.

The process begins by passing light 220 through number of openings 218 of housing 208 (operation 1500). Light 220 may have variations in intensity that carry information that can be used to create an image. In this illustrative example, housing 208 contains intensifier unit 210 and image detection system 212. Light 220 may be received at an input of intensifier unit 210 in this example.

In some illustrative examples, housing 208 may also contain filter system 216. Light 220 that passes through number of openings 218 of housing 208 may also pass through filter system 216 located in housing 208 before reaching intensifier unit 210. Filter system 216 may be used when generating images for bright objects. In some cases, filter system 216 may be used to generate color images.

The process then increases intensity 221 of at least a portion of light 220 received through number of openings 218 using intensifier unit 210 located in housing 208 to form intensified light 238 (operation 1502). Intensifier unit 210 may be implemented using, for example, without limitation, intensifier unit 900 in FIG. 9, intensifier unit 1000 in FIG. 10, intensifier unit 1308 in FIG. 13, intensifier unit 1402 in FIG. 14, an image intensifier tube, and/or any other suitable intensifier unit.

Thereafter, the process converts intensified light 238 into a number of signals for an image using image detection system 212 located inside housing 208 (operation 1504), with the process terminating thereafter. In operation 1504, photons comprising intensified light 238 are converted into electrical signals to form digital image 240. Digital image 240 contains pixels that are obtained by the number of signals.

In this illustrative example, the image detection system may take the form of a charge coupled device, an electron beam charge coupled device, an electron multiplying charge coupled device, or any other suitable image detection system.

Figure 16:
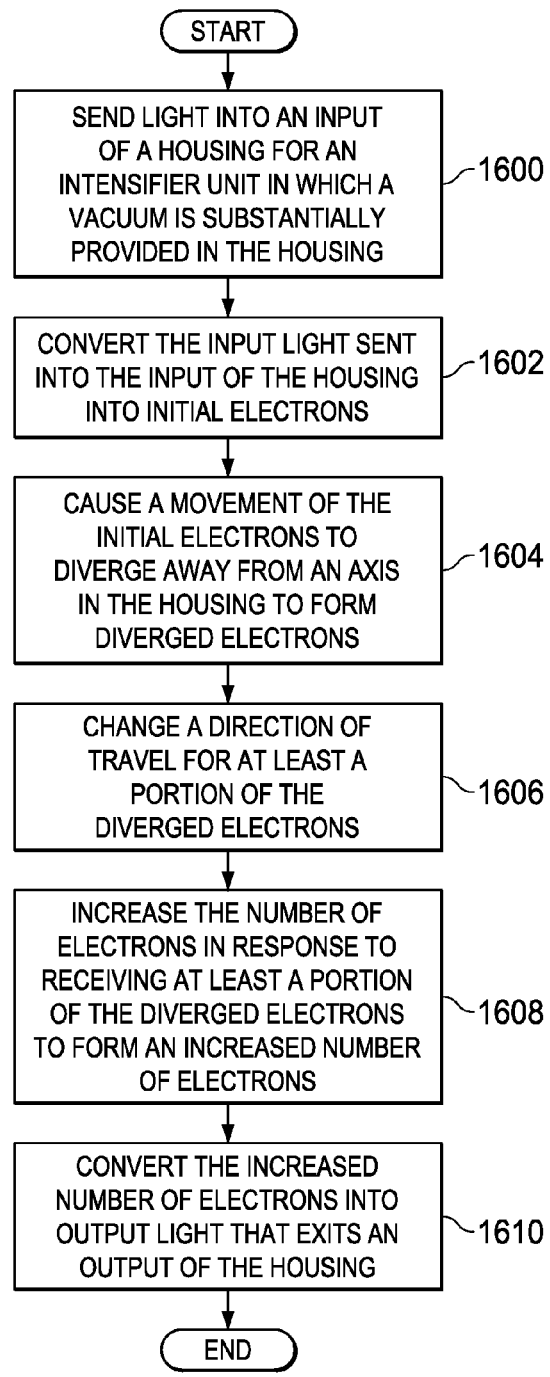
FIG. 16 is an illustration of a flowchart of a process for increasing an intensity of light in accordance with an advantageous embodiment.

With reference now to FIG. 16, an illustration of a flowchart of a process for increasing an intensity of light is depicted in accordance with an advantageous embodiment. The process illustrated in FIG. 16 may be implemented using intensifier unit 900 in FIG. 9. In particular, the process illustrated in FIG. 16 may be used to perform operation 1502 in FIG. 15.

The process begins by sending light into input 914 of housing 902 for intensifier unit 900 in which vacuum 918 is substantially provided in housing 902 (operation 1600). The light received at input 914 is input light 920. Housing 902 contains input unit 904, number of electrostatic lenses 906, number of electrostatic deflectors 908, electron multiplier 910, and output unit 912.

The process then converts input light 920 sent into input 914 of housing 902 into initial electrons 922 (operation 1602). In operation 1602, the conversion of input light 920 into initial electrons 922 is performed by input unit 904. Input unit 904 comprises photocathode 923 that converts the photons comprising input light 920 into initial electrons 922. Initial electrons 922 may also be referred to as initial photoelectrons.

The process then causes a movement of initial electrons 922 to diverge away from axis 924 in housing 902 to form diverged electrons 926 (operation 1604). Initial electrons 922 diverge away from axis 924 in response to an electric field produced by number of electrostatic lenses 906 located in housing 902. The electric field is produced when there is a difference in voltages between number of electrostatic lenses 906. In other words, the electric field is produced by the electric potential difference between number of electrostatic lenses 906. Operation 1604 provides a zoom capability.

Thereafter, the process changes direction of travel 928 for at least a portion of diverged electrons 926 (operation 1606). In operation 1606, the change in direction of travel 928 is substantially perpendicular in these illustrative examples. The change in direction is caused by number of electrostatic deflectors 908 located in housing 902. Number of electrostatic deflectors 908 shifts diverged electrons 926 in a direction substantially perpendicular to axis 924. This shift determines which electrons in diverged electrons 926 reach output unit 912 in intensifier unit 900.

The process then increases the number of electrons in response to receiving at least a portion of diverged electrons 926 to form increased number of electrons 934 (operation 1608). In operation 1608, increased number of electrons 934 are generated by electron multiplier 910 located in housing 902. Electron multiplier 910 may take the form of, for example, number of microchannel plates 931.

Thereafter, the process converts increased number of electrons 934 into output light 936 that exits output 916 of housing 902 (operation 1610), with the process terminating thereafter. Output light 936 is comprised of photons. In operation 1610, increased number of electrons 934 is converted into photons by output unit 912 located in housing 902. Output unit 912 takes the form of a phosphor screen in these examples.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    a housing having a first pinhole opening configured to pass first light into the housing and a second pinhole opening configured to pass second light into the housing, the first pinhole opening having a first diameter given by the equation $d_1 = \sqrt{f_1 k \lambda_1}$ where "$d_1$" is the first diameter, $f_1$ is a first distance from the first pinhole opening to a first selected optimal image plane, $\lambda_1$ is a first selected wavelength of the first light, and k is a constant, the second pinhole opening having a second diameter given by the equation $d_2 = \sqrt{f_2 k \lambda_2}$ where "$d_2$" is the first diameter, $f_2$ is a second distance from the second pinhole opening to a second selected optimal image plane, $\lambda_2$ is a second selected wavelength of the second light, and k is the constant;
    a first shutter attached to the housing and operable to cover and expose the first pinhole;
    a second shutter attached to the housing and operable to cover and expose the second pinhole, wherein the first shutter and the second shutter are configured such that actuation of either the first shutter or the second shutter will cause only one of the first pinhole or the second pinhole to admit light from outside the housing into the housing, while the other of the first pinhole and the second pinhole is covered by a corresponding shutter;

a first reflector inside the housing and configured to reflect the first light from the first pinhole opening towards a second reflector inside the housing, the second reflector configured to reflect the first light towards an image detection system when the second reflector is in a first position;

a third reflector inside the housing and configured to reflect the second light from the second pinhole opening towards the second reflector, the second reflector further configured to reflect the second light towards the image detection system when the second reflector is in a second position; and an image detection system configured to receive the first light and the second light.

2. The apparatus of claim 1 wherein the image detection system is positioned in a location selected from one of inside of the housing or outside of the housing.

3. The apparatus of claim 1 further comprising:
a lens system located inside of the housing and configured to receive the first light and the second light, wherein the lens system is configured to change a field of view of the apparatus.

4. The apparatus of claim 1 further comprising:
a lens system located inside the housing and configured to receive the first light and the second light, wherein the lens system is configured to relay an image at a third optimum image plane to an input of the image detection unit.

5. The apparatus of claim 1 further comprising:
a filter system located inside of the housing, wherein the filter system filters a number of wavelengths of light.

6. The apparatus of claim 5, further comprising:
an intensifier unit located inside of the housing and configured to receive at least a portion of the first light and the second light passing through the opening and increase the intensity of the first light and the second light to form intensified light.

7. The apparatus of claim 5, wherein the filter system comprises a plurality of filters comprising a blue filter, a red filter, and a green filter and wherein the image detection system comprises a first image detection device configured to receive first filtered light from the blue filter, a second image detection device configured to receive second filtered light from the green filter, and a third image detection device configured to receive third filtered light from the third filter.

8. The apparatus of claim 4 wherein the lens system is configured to place substantially an entire image formed at the third optimum plane image to be placed at an input of an intensifier unit, and wherein an output of the intensifier unit comprises an input of the image detection system.

9. The apparatus of claim 1, wherein $d_1$ is configured to be different than $d_2$.

10. The apparatus of claim 1 further comprising one or more additional pinhole openings.

11. The apparatus of claim 1 further comprising:
a first transparent material associated with the first pinhole opening; and
a second transparent material associated with the second pinhole opening.

12. The apparatus of claim 1 wherein the image detection system comprises a charged couple device (CCD).

13. The apparatus of claim 1, wherein the image detection system comprises:
a number of image detection devices.

14. The apparatus of claim 1, wherein the housing and the image detection system form a camera system and further comprising:
a platform attached to the camera system.

15. The apparatus of claim 14, wherein the platform is selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a bridge, and a building.

16. A method implemented using a device, the device comprising:
a housing having a first pinhole opening configured to pass first light into the housing and a second pinhole opening configured to pass second light into the housing, the first pinhole opening having a first diameter given by the equation $d_1=\sqrt{f_1 k \lambda_1}$ where "$d_1$" is the first diameter, $f_1$ is a first distance from the first pinhole opening to a first selected optimal image plane, $\lambda_1$ is a first selected wavelength of the first light, and k is a constant, the second pinhole opening having a second diameter given by the equation $d_2=\sqrt{f_2 k \lambda_2}$ where "$d_2$" is the first diameter, $f_2$ is a second distance from the second pinhole opening to a second selected optimal image plane, $\lambda_2$ is a second selected wavelength of the second light, and k is the constant;

a first shutter attached to the housing and operable to cover and expose the first pinhole;

a second shutter attached to the housing and operable to cover and expose the second pinhole, wherein the first shutter and the second shutter are configured such that actuation of either the first shutter or the second shutter will cause only one of the first pinhole or the second pinhole to admit light from outside the housing into the housing, while the other of the first pinhole and the second pinhole is covered by a corresponding shutter;

a first reflector inside the housing and configured to reflect the first light from the first pinhole opening towards a second reflector inside the housing, the second reflector configured to reflect the first light towards an image detection system when the second reflector is in a first position;

a third reflector inside the housing and configured to reflect the second light from the second pinhole opening towards the second reflector, the second reflector further configured to reflect the second light towards the image detection system when the second reflector is in a second position; and an image detection system configured to receive the first light and the second light, the method comprising:

receiving the first light from the first pinhole opening, wherein the first light passes to the first reflector, thereafter to the second reflector, and thereafter to the image detection system; and resolving a first image from the first light using the image detection system.

17. The method of claim 16 further comprising:
closing the first shutter;
opening the second shutter;
rotating the second reflector to the second position;
receiving the second light from the second pinhole opening, wherein the second light passes to the third reflector, thereafter to the second reflector, and thereafter to the image detection system; and
resolving a second image from the second light using the image detection system.

18. The method of claim 17, wherein closing the first shutter causes the second shutter to open.

19. The method of claim 16, wherein the device further comprises an intensifier unit located inside of the housing and configured to receive at least a portion of the first light and the second light passing through the opening and increase the intensity of the first light and the second light to form intensified light, and wherein the method further comprises:
 intensifying the light using the intensifier unit before resolving the first image.

20. The method of claim 16, wherein the device is attached to an aircraft, and wherein the method further comprises:
 using the device while flying the aircraft.

21. The method of claim 16, wherein the device is attached to a platform, and wherein the method further comprises:
 using the device while operating the platform.

22. The method of claim 21 further comprising:
 changing a field of view of the device without moving the device relative to the platform.

23. The method of claim 22, wherein the device further comprises a lens system located inside of the housing and configured to receive the first light and the second light, wherein the lens system is configured to change the field of view of the device, the method further comprising:
 changing the field of view using the lens system.

* * * * *